United States Patent
Allen et al.

(10) Patent No.: US 12,453,789 B2
(45) Date of Patent: Oct. 28, 2025

(54) HIGH-FLUENCE OPTIC

(71) Applicant: CURRENT LIGHTING SOLUTIONS, LLC, East Cleveland, OH (US)

(72) Inventors: Gary R. Allen, Euclid, OH (US); Mark E. Kaminski, Cleveland, OH (US); Kevin J. Benner, Solon, OH (US)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 1056 days.

(21) Appl. No.: 17/346,590

(22) Filed: Jun. 14, 2021

(65) Prior Publication Data

US 2022/0395593 A1    Dec. 15, 2022

(51) Int. Cl.
| | |
|---|---|
| *A61L 2/10* | (2006.01) |
| *A61L 2/26* | (2006.01) |
| *F21V 5/00* | (2018.01) |
| *F21V 7/04* | (2006.01) |
| *F21V 17/06* | (2006.01) |
| *F21V 21/03* | (2006.01) |

(52) U.S. Cl.
CPC ............... *A61L 2/10* (2013.01); *A61L 2/26* (2013.01); *F21V 5/00* (2013.01); *F21V 7/041* (2013.01); *F21V 17/06* (2013.01); *F21V 21/03* (2013.01); *A61L 2202/11* (2013.01); *A61L 2202/25* (2013.01)

(58) Field of Classification Search
CPC ........................................................ A61L 2/10
See application file for complete search history.

(56) References Cited

U.S. PATENT DOCUMENTS

| | | | |
|---|---|---|---|
| 9,291,320 B2* | 3/2016 | Durkee | ................ F21S 8/04 |
| 9,937,274 B2 | 4/2018 | Clynne et al. | |
| 2009/0117000 A1* | 5/2009 | First | ................ A61L 9/20 |
| | | | 422/24 |
| 2015/0338059 A1* | 11/2015 | Allen | ............... F21V 17/06 |
| | | | 362/300 |
| 2020/0353112 A1 | 11/2020 | Randers-Pehrson et al. | |

* cited by examiner

*Primary Examiner* — Kevin Joyner
(74) *Attorney, Agent, or Firm* — Lippes Mathias LLP

(57) ABSTRACT

An irradiation method includes irradiating an environment with light using one or more one ceiling-mounted light sources, where each ceiling-mounted light source has an optical axis oriented vertically downward, and wherein each ceiling-mounted light source emits a light distribution having more angle-integrated intensity in a higher angular range relative to the optical axis of the ceiling-mounted light source than in a lower angular range relative to the optical axis of the ceiling-mounted light source. A ceiling-mounted light source may include a support structure, one or more light emitters disposed on a surface of the support structure, and a reflector with a funnel-shaped reflective surface facing the support structure and expanding with increasing distance from the support structure along the optical axis. The light emitters may be ultraviolet (UV) light emitters whereby the light source is a UV ceiling-mounted light source.

21 Claims, 12 Drawing Sheets

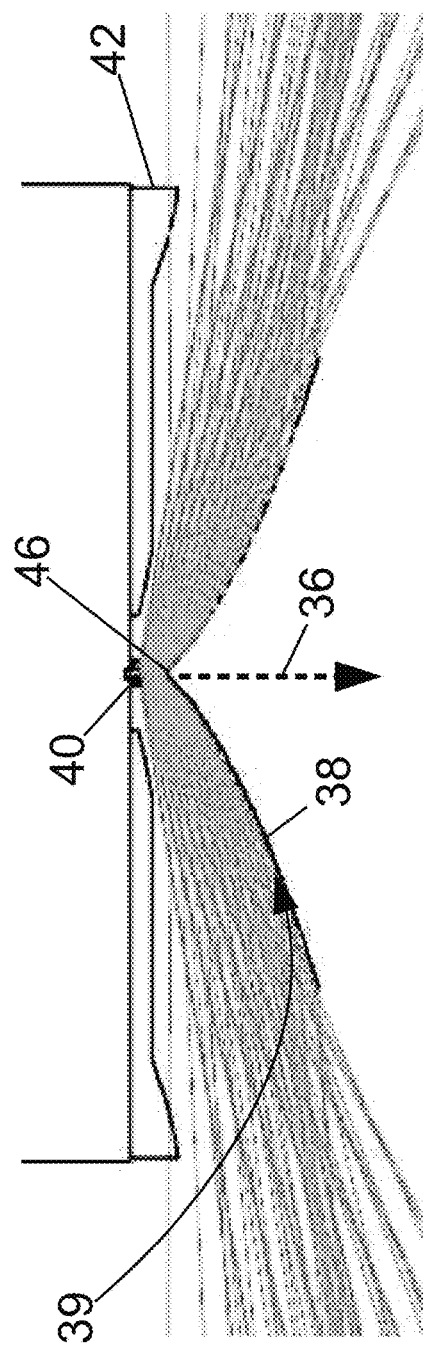
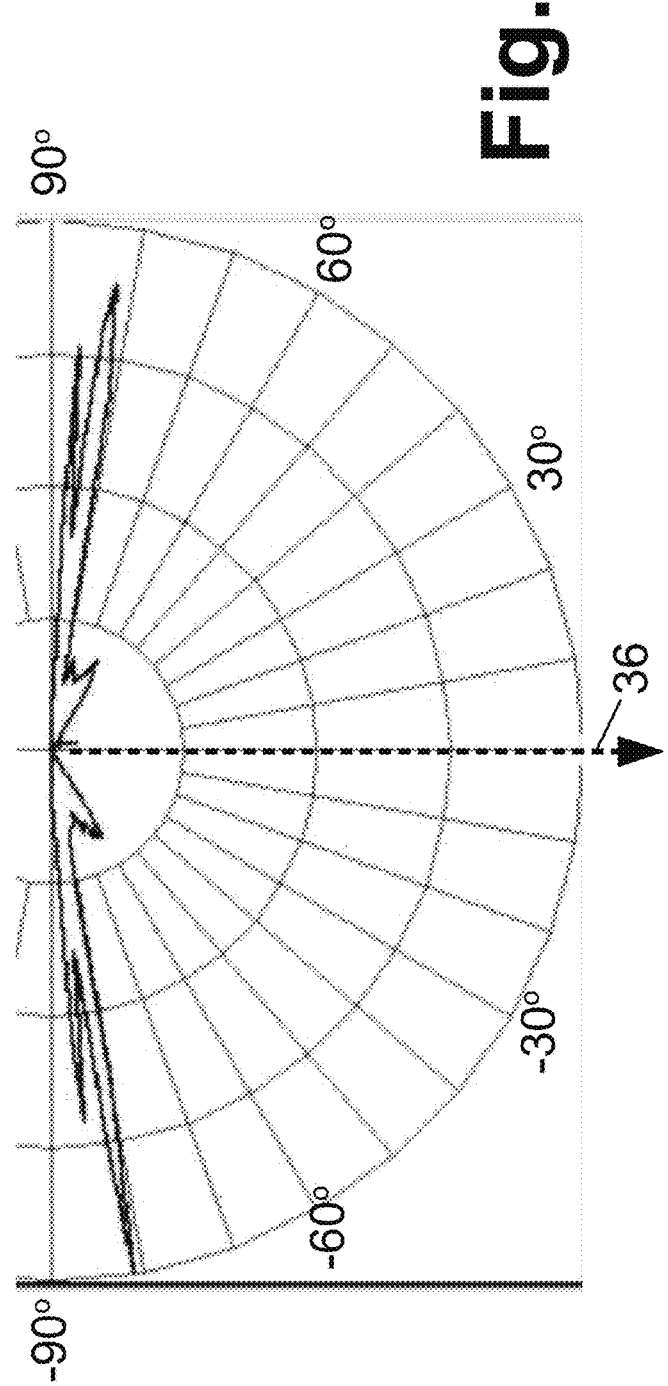
Fig. 7A
Fig. 7B

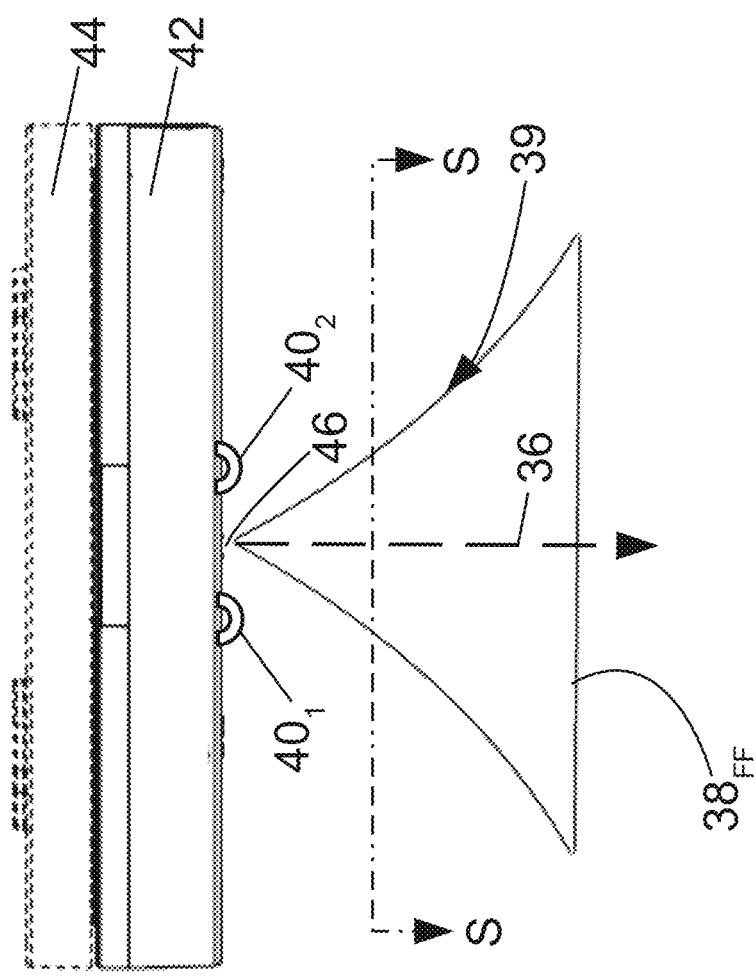

HIGH-FLUENCE OPTIC

BACKGROUND

The following relates to the disinfection arts, pathogen control arts, viral pathogen control arts, and the like.

Disinfection systems that deploy ultraviolet (UV) light sources for disinfection in occupied spaces are known. For example, Clynne et al., U.S. Pat. No. 9,937,274 B2 issued Apr. 10, 2018 discloses a system comprising: a light source configured to generate ultraviolet light toward one or more surfaces or materials to inactivate one or more pathogens on the one or more surfaces or materials in an environment for human occupancy. The light may include an inactivating portion having peak wavelength in a range of greater than 300 nanometers to below 380 nanometers. Use of other ultraviolet spectral ranges for disinfection of occupied spaces is also known. For example, Randers-Pehrson et al., U.S. Pub. No. 2020/0353112 A1 discloses "it can be possible to utilize one or more UV excilamps, or one or more UV lasers or other coherent light sources, which, in contrast to standard UV lamps, can produce UV radiation at a specific wavelength—for example, around 200 nm. UV radiation around such exemplary wavelength (e.g., a single wavelength or in a range of certain wavelengths as described herein) can penetrate and kill bacteria, but preferably would not penetrate into the nucleus of human cells, and thus, can be expected to be safe for both patient and staff."

Certain improvements are disclosed.

BRIEF DESCRIPTION

In some illustrative embodiments disclosed herein, an ultraviolet (UV) irradiation system comprises a light source having an optical axis. The light source includes a support structure, one or more UV light emitters, and an optic. The support structure is configured to be mounted on a ceiling with the optical axis of the light source oriented vertically downward. The one or more UV light emitters are disposed on a surface of the support structure and configured to emit UV light when electrically energized. The optic is secured to the support structure and is arranged to form the UV light emitted by the UV light emitters into a light distribution having more angle-integrated intensity in the angular range $\theta_{Tr}$ to 90° relative to the optical axis than in the angular range 0° to $\theta_{Tr}$ relative to the optical axis, where $\theta_{Tr}$ is at least 55°. In some embodiments, $\theta_{Tr}$ is at least 65°. In some embodiments, the light distribution has at least 3 times more angle-integrated intensity in the angular range $\theta_{Tr}$ to 90° relative to the optical axis than in the angular range 0° to $\theta_{Tr}$ relative to the optical axis. In some embodiments, the optic comprises a funnel-shaped reflective surface facing the support structure, in which the funnel-shaped reflective surface is expanding with increasing distance from the support structure along the optical axis. In some such embodiments, the funnel-shaped reflective surface has N facets and has N-fold rotational symmetry about the optical axis. In some embodiments, the optic comprises a refractive optic mounted over the one or more UV light emitters on the support structure. In some embodiments, the UV irradiation system includes a plurality of said light sources mounted on a ceiling.

In some illustrative embodiments disclosed herein, an irradiation method includes irradiating an environment with light using one or more one ceiling-mounted light sources. Each ceiling-mounted light source has an optical axis oriented vertically downward. Each ceiling-mounted light source emits a light distribution $I(\theta,\phi)$ satisfying the inequality: $\int_0^{2\pi} d\phi \int_{\theta_{Tr}}^{90} I(\theta,\phi) \sin\theta d\theta > W_H \cdot (\int_0^{2\pi} d\phi \int_0^{\theta_{Tr}} I(\theta,\phi) \sin\theta d\theta)$, where angle $\theta$ is measured respective to the optical axis and $\theta=0°$ corresponds to the optical axis, angle $\phi$ is the orthogonal angle in spherical coordinates, $W_H$ is a weight parameter, and angle $\theta_{Tr}$ is a threshold angle parameter. Weight parameter $W_H$ is greater than or equal to 1 and $\theta_{Tr}$ is greater than or equal to 55°. In some embodiments $\theta_{Tr}$ is at least 65°. In some embodiments $W_H$ is greater than or equal to 3. In some embodiments, each ceiling-mounted light source includes one or more light emitters emitting light and an optic having a funnel-shaped reflective surface arranged to reflect the light emitted by the one or more light emitters into said light distribution. In some embodiments, each ceiling-mounted light source includes one or more light emitters emitting light and a refractive optic mounted over the one or more light emitters to refract the light emitted by the one or more light emitters into said light distribution. In some embodiments, light distribution $I(\theta,\phi)$ is an ultraviolet (UV) light distribution, and the irradiation method further includes deactivating at least one pathogen using the light distribution $I(\theta,\phi)$.

In some illustrative embodiments disclosed herein, a light source is disclosed, which has an optical axis. The light source includes a support structure, one or more light emitters, and a reflector. The support structure is configured to be mounted on a ceiling with the optical axis of the light source oriented vertically downward. The one or more light emitters are disposed on a surface of the support structure and are configured to emit light when electrically energized. The reflector has a funnel-shaped reflective surface facing the support structure and has an apex positioned on the optical axis of the light source. The reflector is oriented with the funnel-shaped reflective surface expanding with increasing distance from the support structure along the optical axis. In some embodiments, the one or more light emitters comprise UV light emitters whereby the light source is a UV light source. In some embodiments, the funnel-shaped reflective surface comprises a conoidal reflective surface shaped as a solid described by revolution of a conic section about the optical axis or a revolution of a fusion of conic sections about the optical axis. In some embodiments, the funnel-shaped reflective surface has a shape described by a revolution of one curved section or a fusion of two or more straight or curved sections about the optical axis. In some embodiments, the funnel-shaped reflective surface has N facets and has N-fold rotational symmetry about the optical axis. In some embodiments, the funnel-shaped reflective surface has a curvature comprising a curved section or a fusion of two or more straight or curved sections. In some embodiments, the light source further includes at least three arms attaching the reflector to the support structure. In some such embodiments, the arms are curved and attach to a side of the reflector opposite from the funnel-shaped reflective surface.

BRIEF DESCRIPTION OF THE DRAWINGS

The following is a brief description of the drawings, which are presented for the purposes of illustrating the exemplary embodiments disclosed herein and not for the purposes of limiting the same.

FIGS. 7A and 7B diagrammatically shows: (A) ray tracings graphically depicting the light distribution produced by the light source of FIGS. 3 and 4; and (B) a polar intensity-versus angle plot for the light source of FIGS. 3 and 4.

FIGS. 8A and 8B and 8C diagrammatically show a funnel-shaped reflector according to another embodiment, this embodiment having four-fold rotational symmetry, where: FIG. 8A illustrates a side-sectional view of the light source employing the funnel-shaped reflector with four-fold rotational symmetry, and FIG. 8B illustrates an isolation view of the reflector with four-fold rotational symmetry looking down the apex.

FIG. 8C shows Section S-S indicated in FIG. 8A.

DETAILED DESCRIPTION

Figure 1:
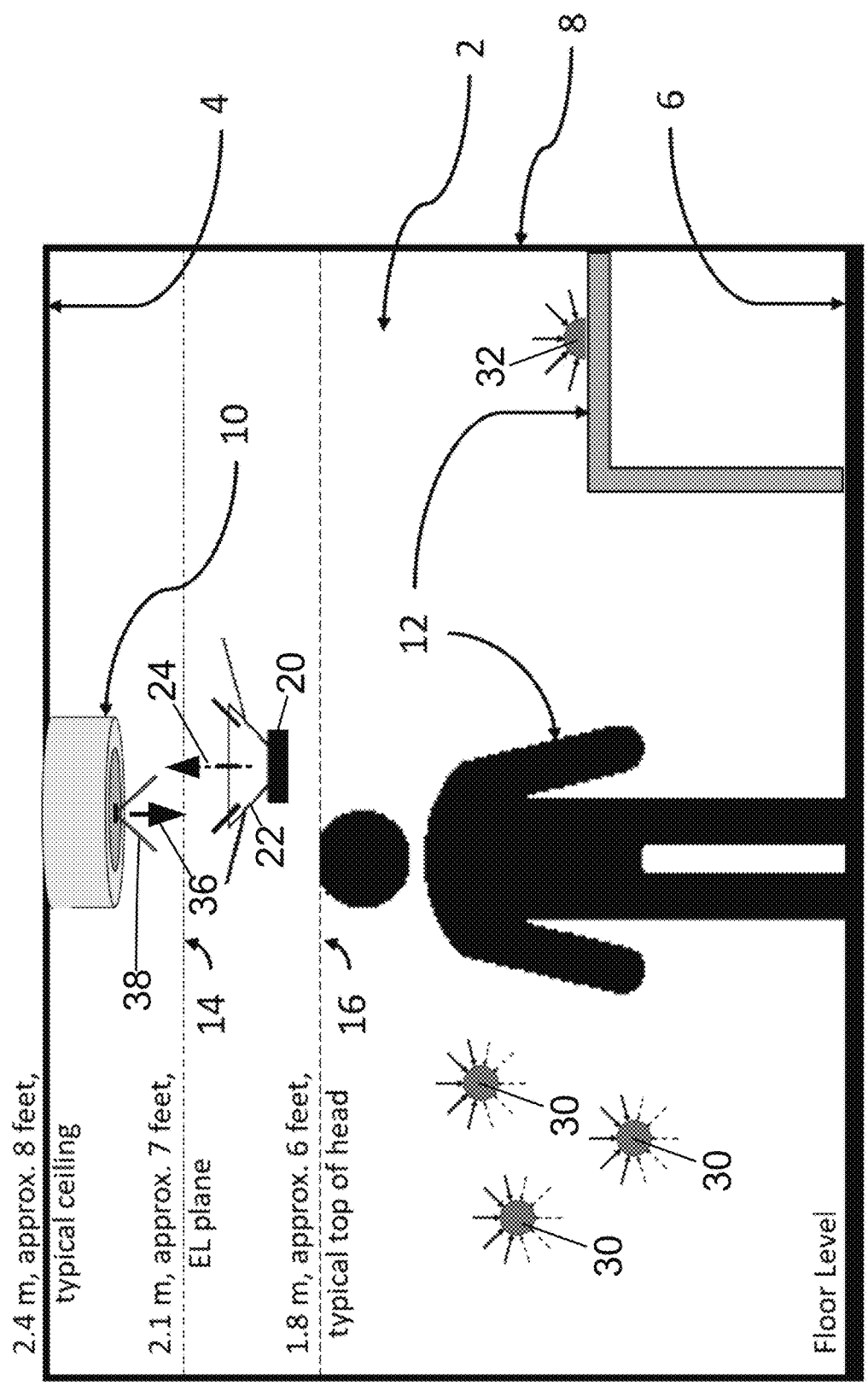
FIG. 1 diagrammatically illustrates a disinfection system for inactivating pathogens in an environment for human occupancy.

In general, it is recognized herein that light in a wide range of wavelength regions (e.g., UV-A, UV-B, UV-C, Visible, Infrared, et cetera) can be usefully applied in an environment for human occupation, such as a hospital, residence, office, greenhouse, or so forth, in illumination (visual) as well as non-illumination applications. (The term "light" is broadly used herein to encompass ultraviolet, visible, and infrared light and "UV light" is broadly used herein to encompass the entire ultraviolet wavelength, for example often considered to encompass the wavelength range of 10 nm to 400 nm). An environment for human occupation (or occupancy) may or may not be occupied during the application of the light; may be indoors or outdoors, or some hybrid; may be a built or natural environment, and so on. UV light can be usefully applied in an environment for human occupancy for a wide range of purposes, including (by way of non-limiting illustrative example): to perform UV disinfection (that is, inactivation of bacteria, viruses, and/or other target pathogens); enhancing growth of plants (for example, in a greenhouse); providing Circadian lighting for enhancing human health in an indoor setting or other setting in which natural sunlight is limited, and/or so forth.

Light applied in an environment for human occupancy is typically regulated to ensure human safety. For example, internationally recognized guidelines and standards have been established to provide exposure limits to avoid hazardous levels of light radiation to human eyes and skin (see, e.g. Photobiological safety of lamps and lamp systems, IEC 62471:2006, and related documents). Complying with such regulations entails limiting the amount of light emitted into the environment for human occupancy—however, such limits also limit the efficacy of the light for the intended purpose (e.g., illumination, target pathogen disinfection, providing the UV component of grow lighting, et cetera). The regulations pertain to hazards to human skin and eyes, and cover all wavelengths of light from 200 to 3,000 nm (UV, Visible, and Infrared). Light of any wavelength may be hazardous if applied above the allowed exposure limit pertaining to that wavelength; conversely, light of any wavelength may be non-hazardous if applied below the allowed exposure limit. In the UV, each of the hazards is measured in irradiance (W/m$^2$) incident upon the human skin or eye. This disclosure will provide examples and applications related to UV hazards measured as irradiance, but the optical principles apply to other wavelength regions as well. For example, Circadian lighting and Horticultural lighting are primarily provided by visible wavelengths, but the enhanced fluence from various directions provided by this disclosure can be preferred for some Circadian and Horticultural lighting applications.

To increase the lighting efficacy without exceeding the allowed exposure limit, occupancy sensor-based lighting control can be added to detect actual occupancy. In this way, the UV light irradiance can be reduced to a regulation-compliant level when the space is occupied, and the irradiance can be increased above that level when unoccupied. However, occupancy sensor-based lighting control adds substantial complexity to the system, especially since safety is implicated such that the control may be required to include redundancy or other fail-safe measures.

UV optic embodiments for use in an environment for human occupancy disclosed herein provide for a higher UV fluence levels in the space for human occupancy for a given irradiance metric. As described below, the disclosed UV optic embodiments leverage the insight made herein that UV safety regulations typically are based on irradiance, since the main concern is damage to human body surfaces (particularly the eyes and exposed skin) for which an area metric of light such as irradiance is appropriate. On the other hand, for some UV lighting applications for use in an environment for human occupancy, the efficacy of the UV light is more appropriately measured in fluence rate, rather than using an irradiance metric. For example, an airborne pathogen (e.g. an airborne virus, or an airborne bacterium cell) can receive radiation from any direction. By contrast, a surface of the human body only receives radiation on that surface. Based on these insights, UV light sources disclosed herein are designed to increase the fluence rate while still satisfying a given irradiance-based safety metric.

In the following, the UV optic is typically described as being used in conjunction with a UV light-emitting diode (UV-LED) or a plurality of UV LEDs. However, it will be appreciated that the light emitters may more broadly encompass other solid-state light sources such as a laser diode, OLED, or so forth, or a sufficiently small mercury or xenon or excimer lamp or the like. In non-limiting illustrative modeling of light distributions and other operational characteristics, it will generally be assumed the light emitter has a relatively small size, e.g., up to a few cm in extent, such as a miniature mercury or xenon or excimer lamp. In many applications, the LED light sources (including the UV light emitter and the UV optic) are constrained to a bounded location at a distance away from the target or the space to be irradiated. An example application is irradiation of a volume of air or a surface area for the purpose of disinfecting pathogens in the air and/or on the surface(s) where the LEDs are mounted on or in the ceiling, which advantageously ensures occupants are unlikely to be closer to the radiant light source than a "head level" of a particularly tall occupant. This keeps the UV light exposure of the occupants below regulatory limits. Another example application is the irradiance of plants grown by artificial light where the light sources may only be mounted above the plants, or in just one or a few limited directions relative to the plants. The plants may benefit from an angular distribution of light that mimics that of natural daylight, providing light incident onto the leaves of the plant from all directions other than from below, including downward light and sideways light from all sides. Another example may be the desire to illuminate a space with a higher proportion of vertical illuminance (illumination of a vertical surface, e.g., a wall) vs. horizontal illuminance (e.g., a desktop), as is preferred in some Circadian lighting applications than is provided by conventional light sources and optics where the light source location is constrained to the ceiling only. This disclosure includes light sources emitting light in the visible or ultraviolet or infrared ranges of light, since there are applications benefiting from enhanced light fluence rate across all of wavelengths of light.

Historically, most illumination (visible light) and irradiation (non-visible light) systems have provided intensity distributions directed to a target object, such as to illuminate a picture on a wall, or directed to broadly illuminate or irradiate a surface, such as a wall or a desktop or floor. Such irradiation is usually provided from light sources in or near the ceiling. Conversely, the ceiling may be irradiated by light sources on or near a wall or floor with light directed to the ceiling. Optic embodiments disclosed herein provide for an intensity distribution that provides nearly uniform hemispherical irradiance (vertical and horizontal irradiance combined) of an object positioned in the air space or on a surface in the space, from light sources constrained to one plane adjacent to the space, e.g., the ceiling.

In some embodiments disclosed herein, enhanced fluence rate is provided in a space for human occupation while avoiding overexposure of irradiation to human eyes and skin. The avoidance of overexposure to the eye is achieved in part by design taking into account the limited range of angles of incidence that can reach the eye due to the occlusion of incoming light by the structure of the skeletal orbit and eyelids of the human eye. An optic may thus be designed to enhance the fluence rate onto an object within the space while restricting the irradiance incident onto the eye at any location, and in any orientation, at or below the Exposure Limit (EL) plane, by suitable design of the intensity distribution produced by the optic.

In lighting terminology, a point of confusion sometimes arises in that the more common term "irradiance" carries the same dimensions as "fluence rate" and has a related meaning. For clarity, this disclosure adopts standard definitions used in photochemistry (2007, Braslaysky, GLOSSARY OF TERMS USED IN PHOTOCHEMISTRY, 3rd EDITION, Pure Appl. Chem., Vol. 79, No. 3, pp. 293-465, 2007) as follows:

Fluence—"At a given point in space, the radiant energy, Q, incident on a small sphere from all directions divided by the cross-sectional area of that sphere. SI unit is J/m$^2$."

Irradiance—"Radiant power, P, of all wavelengths incident from all upward directions on a small element of surface containing the point under consideration divided by the area of the element. SI unit is W/m$^2$."

Fluence rate is the instantaneous value of the fluence, i.e. at a given point in space, the radiant optical power, P, incident on a small sphere from all directions divided by the cross-sectional area of that sphere, suitably measured in SI units of W/m$^2$. Fluence rate is also sometimes referred to as spherical irradiance.

The differences between "irradiance" and "fluence rate" is thus that irradiance is a measure of the light incident upon a small element of area from upward directions, while fluence rate is a measure of light incident upon a small sphere from all directions.

When considering the dose of UV light incident upon an airborne particle (e.g. a virus, bacterium, or other pathogen particle), fluence rate is the measure of interest since the light may be absorbed by the particle from all directions. On the other hand, when considering the dose of UV light incident upon a person, irradiance is the measure of interest in determining the radiation hazard to human skin and eyes since the light may be absorbed at any given point only from an upward, or outward, direction from the surface (of the skin or eye) on which the exposed point is located.

A family of internationally recognized guidelines and standards provide exposure limits to avoid hazardous levels of light radiation to human eyes and skin (Photobiological safety of lamps and lamp systems, IEC 62471:2006, and related documents). In particular regard to UV light, the human eye is much more sensitive than the skin such that the allowed exposure is limited by that pertaining to the eye. Because of this, the method of measuring the irradiance of UV light in a space is specified in IEC 62471 and the related guidelines and standards to be limited to the acceptance angle of the human eye within its anatomical orbit, specifically accepting light radiation within an 80-degree range of angles (40-degree half-angle relative to normal incidence on the eye, or a corresponding mimicking light detector). The method of IEC 62471 states "For a number of reasons, including the physiology of the eye, all the exposure levels for ultraviolet radiation discussed in clauses 4.3.1 and 4.3.2 apply to sources that subtend an angle less than 80 degrees (1.4 radian), i.e., sources within 40 degrees of the normal to the irradiance area. Thus, emission from sources that subtend a greater angle need to be measured only over a full angle of 80 degrees."

With reference now to FIG. 1, by way of nonlimiting illustration a disinfection system for inactivating pathogens (e.g. bacteria, viruses, et cetera) is configured to disinfect an environment 2 for human occupancy, such as an illustrated room 2 having a ceiling 4, floor 6, and walls 8. More generally, the environment 2 for human occupancy can be a room (which could be a conference room, medical operating room, a hallway, or so forth), or a vehicle cabin, an aircraft cabin, train compartment, or so forth, or even an outdoor environment (which could be a shopping cart corral or picnic venue, or so forth). The disinfection system includes at least one UV light source 10 configured to emit light into the environment 2 for human occupancy to inactivate one or more pathogens suspended in ambient air of the environment 2 or residing on surfaces 12 or materials, including human skin or eyes. A single ceiling-mounted light source 10 is shown for illustration in FIG. 1 but the system can include a plurality of such ceiling-mounted light sources, which may be distributed over the ceiling 4 to apply the UV light to most or all the ambient air in the environment 2. Complete coverage may not be necessary, however, if the ambient air in the environment 2 is circulating so that air in any "dead" areas that are not illuminated by the light will move by convection or other circulation into illuminated areas. It is noted that the UV light source 10 may optionally emit some light outside of the UV spectrum, for example the spectrum of the UV light source 10 may include both UV and violet, or UV and white, spectral components. The choice of wavelength or spectrum output by the UV light source 10 may be chosen based on the type or types of pathogens targeted to be inactivated. For example, it is typical (though not universal) that virus particles are more effectively inactivated by UV-C radiation compared with UV-A radiation. Hence, a disinfection system that includes both UV-A light sources and UV-C light sources can provide effective disinfection of both bacteria and viruses.

The environment 2 may, for example, be a volume or space or room, for example the illustrative environment 2 is a volume enclosed by the ceiling 4, floor 6 and walls 8. The exposure limit (EL) is measured at an EL plane 14, which in the illustrative example is 2.1 m above the floor 6. The "occupied volume" of the environment 2 is a sub-volume of the total volume 2 that is typically bounded by the EL 14, floor 6, and walls 8. The "upper room" is a sub-volume of the total volume 2 is typically bounded by the ceiling 4, EL 14, and walls 8.

FIG. 1 further shows an irradiance detector 20 having an acceptance cone 22 limiting incident rays within an 80-degree cone (equivalent to a 40-degree half-cone) being admitted onto an irradiance detector, while rays outside of the 80-degree cone are excluded from the detector by the acceptance cone 22 (which may, for example, be implemented as a physical light-absorbing cone, or an aperture spaced away from the detector). The irradiance detector 20 may be used to measure irradiance at any location and orientation in the environment 2. In some safety testing approaches, the irradiance detector 20 may be positioned to measure irradiance from the light source(s) 10 by orienting the detector with its optical axis 24 pointed vertically upward, as shown, to measure the maximum irradiance at a given horizontal plane produced by the light source(s) 10. The horizontal plane chosen for measurement depends upon the regulatory safety scheme or other safety definition being used. For example, in some embodiments the irradiance detector 20 may be positioned to measure irradiance at the illustrative plane located 1.8 meters above the floor 6, corresponding to head level. In other embodiments the irradiance detector 20 may be positioned to measure irradiance at the illustrative exposure limit (EL) plane located 2.1 meters above the floor 6, corresponding to the measurement plane specified in IEC 62471.

FIG. 1 thus represents the geometry of an irradiance meter 20 combined with a light-absorbing acceptance cone 22 configured to measure incoming light only in a 40-degree half-angle from the normal 24 to the plane of the detector 20. This measurement protocol specified in IEC 62471 is based on the anatomy of the human eye, which has about a 40° acceptance half-angle due to the eye socket. Hence, irradiance measurements herein utilize a 40° acceptance half-angle. However, it is contemplated more generally for the irradiance measurement to employ an acceptance angle of $\theta_A/2$ (corresponding to an acceptance cone of $\theta_A$), where $\theta_A$ is typically 80° (corresponding to half-angle $\theta_A/2=40°$) but may deviate somewhat from 80°, for example if the optic is being designed in accord with a different regulatory standard that uses an angle of (for example) $\theta_A/2=45°$.

By contrast, with further reference to FIG. 1, airborne particles 30 (such as virus particles, bacterium cells, or other airborne pathogen particles; shown diagrammatically in FIG. 1 since virus particles are typically on the order of tens of nanometers in diameter while bacterium cells are on the order of hundreds of nanometers to a micron or few microns in diameter) can receive light from any angle, i.e., over a full $4\pi$ steradians. It is recognized that aerosolized pathogens introduced by human respiration into the environment are typically not bare pathogens, but are enveloped in a sphere of partially desiccated "droplet nuclei" from exhalation, typically ~1-100 microns in diameter, containing water, mucins and other proteins. Droplet nuclei typically transmit UV wavelengths with high efficiency, so that the UV fluence rate level and direction on the surface of the enclosed pathogen is typically approximately the same intensity and angle of incidence as on the surface of the droplet nuclei. This is a fluence rate metric, rather than an irradiance metric, and is indicated by light rays from all directions shown directed into the particles 30. In the case of disinfection by ceiling-mounted lighting, however, the overhead lighting can only directly illuminate the upper hemisphere of the particle since the overhead lighting produces only downwardly directed light rays, so the fluence rate is over a hemisphere ($2\pi$ steradians). This is indicated in FIG. 1 by the downwardly directed light rays being shown in solid lines and the (missing) upwardly directed light rays being shown in broken lines. A surface-bound particle 32 also is diagrammatically shown, and is also illuminated only from overhead by the ceiling-mounted lighting so that the fluence rate is again over a hemisphere ($2\pi$ steradians), though in this case upward illumination is physically blocked by the surface on which the surface-bound particle 32 rests.

Based on these insights, optics disclosed herein provide an intensity distribution exhibiting enhanced fluence rate to a particle or other object in the space, while being constrained to remain below the allowed maximum irradiance to the eye measured for an acceptance half-angle $\theta_A/2$ that is typically 40° or close thereto.

In the application of UV irradiation emitted into an occupied space (sometimes referred to herein as Direct Irradiation Below Exposure Limits, DIBEL) to inactivate airborne pathogens, the maximum allowed exposure in a 24-hour period is 30 J/m$^2$ weighted according to wavelength by the Actinic Hazard Spectrum which is normalized to 1.0 at 270 nm in UV-C. At both shorter and longer wavelengths than 270 nm, the allowed exposure is greater, e.g., amounting to 60 J/m$^2$ at 254 nm and 100 J/m$^2$ at 300 nm (in the UV-B). For Actinic (200-400 nm) light sources mounted in the ceiling, the irradiance is specified to be measured at 2.1 m above the floor level, per IEC 62471, with the radiometer (irradiance meter) aimed in the direction that provides the highest reading. These IEC standards will be referenced in illustrative examples herein, although the approaches are readily adapted to other current or future exposure limit regulatory frameworks. In the application of UV irradiation emitted into an occupied space to inactivate airborne pathogens, the amount of UV fluence required to inactivate at least 90% of the pathogens in the space is given by the $D_{90}$ dose in J/m$^2$. Most airborne viruses have $D_{90}$ values in the range of about 2 to 20 J/m$^2$ at 254 nm, the wavelength at which most of the published results over many decades have been provided. For example, $D_{90}$ for SARS-CoV-2 virus at 254 nm in air is about 2 to 5 J/m$^2$, and $D_{90}$ for Influenza A in air is about 10 to 20 J/m$^2$.

For example, using UV at 270 nm for disinfection of SARS-CoV-2 in air, the exposure limit of 30 J/m$^2$ is about ten times larger than $D_{90}$ which is only about 3 J/m$^2$. This means that disinfection with 90% virus deactivation can be performed in compliance with IEC 62471 while the space is occupied, by delivering a UV dose that is greater than 3 J/m$^2$ and less than or equal to 30 J/m$^2$. If the UV is applied continuously to provide uninterrupted disinfection, for example for 24 hours, then the dose compliant with the exposure limit might be parsed uniformly throughout the 24-hour period, providing at most 1.25 J/m²/hr. Then a $D_{90}$ dose of 3 J/m² may be provided in a time $t_{90}$ of about 2.4 hours (144 minutes) or longer. (Here $t_{90}$ denotes the time to achieve 90% deactivation of pathogen particles, or equivalently, the time required to deliver the $D_{90}$ dose). In some practical applications, $t_{90}$ will be longer since uniformity of the irradiance throughout the occupied volume may be limited to (for example) about 80%, the efficiency of the UV-C LED may depreciate to about 70% over its useful life, and there may be an additional safety margin of about 20% in regard to the exposure limit. These 3 factors of about 0.8*0.7*0.8~0.4 may increase $t_{90}$ from its theoretically achievable value of about 144 minutes to a practical value of about 360 minutes for SARS-CoV-2 virus, or any pathogen having $D_{90}$~3 J/m². In that an infectious dose of SARS-CoV-2 may be inhaled by a susceptible person in about 10 to 30 minutes, it is desirable to reduce $t_{90}$ to a time comparable to, or shorter than, the time to inhale an infectious dose. Thus, the practical $t_{90}$ value of 360 minutes should be reduced by at least about 18× to 36×, or approximately about 20×.

Another design option for an exposure limit-compliant system is to reduce the duration of irradiation from 24 hours to 8 hours in each day (corresponding to a typical work shift) with a concomitant increase by a factor of three in the UV fluence rate, thus enabling the exposure limit dose to be reached in only 8 hours, taking advantage of Time Weighted Averaging (TWA) that is enabled by the IEC 62471 regulations, so that the required $t_{90}$ may be reduced from 360 minutes to 120 minutes. In another design option, if the UV-C irradiation is applied only during a one-hour duration (for example, during a one-hour meeting), then the TWA acceleration of inactivation may reduce $t_{90}$ by about another 8× to about 15 minutes (but now with an eightfold increase in the UV fluence rate). Thus, the tactic of limiting the dose to a short period of time can achieve the desired reduction of $t_{90}$ to about 10 to 20 minutes.

Another design option for an exposure limit-compliant system is to use a UV wavelength shorter or longer than 270 nm, leveraging the increased EL at other wavelengths. A benefit as large as about 8× may be accrued in this manner by use of a wavelength of about 220 nm, as in some excimer technologies.

Other scenarios, such as irradiating only during periods of high occupancy density, vigorous physical activity, or detection of coughing, sneezing or loud voices, may enable further TWA enhancements beyond that 8×. In many designs, however, a $t_{90}$ value of 8-hour to 24-hour irradiation duration is chosen in conjunction with a light source that emits UV light at a constant irradiance level, as constant irradiation simplifies the design and these values of $t_{90}$ provide continuous disinfection throughout the most common occupancy periods; and to reduce the $t_{90}$ value for pathogens having $D_{90} \gg 3$ J/m², for example Influenza A, certain spores, and many others. Other combinations of UV wavelength, EL, duration of irradiation, and $D_{90}$ for other pathogens similarly require a reduction in $t_{90}$ of at least about 5× up to greater than 30×.

To generalize, the foregoing dose-based UV disinfection lighting design imposes two dose constraints: a lower limit on the dose set by the sufficient disinfection dose (e.g., $D_{90}$ or values derived therefrom); and an upper exposure limit (EL), e.g. a maximum dose set by governing UV safety regulations. Within these two constraints, a design-basis UV dose is chosen. In some designs, the design-basis dose is set to the EL minus some chosen safety margin to account for manufacturing variations in lamp output or other practical considerations, as this will provide the maximum dose for rapid pathogen deactivation.

However, as dose is a time-integrated value, to design the UV light source 10 a design-basis time interval is chosen, to convert the design-basis UV dose into a design-basis UV irradiance for achieving the design-basis dose. The design-basis time interval may be set based on a regulatory standard, and/or chosen based on practical considerations such as maintaining 24 hour disinfection or delivering the time-basis dose over an 8 hour work shift. With the design-basis dose and the design-basis time interval both chosen, and assuming the light source outputs a constant irradiance over the design-basis time interval, the design-basis UV irradiance at the EL plane 14 can be set equal to the design-basis dose divided by the design-basis time interval.

A typical ceiling-mounted light source outputs light generally downward, with a light intensity distribution centered on an optical axis of the light source. For a ceiling-mounted light source or other "downlight", the optical axis usually corresponds to a nadir 36 (i.e., directly downward direction, that is, oriented vertically downward) of the ceiling-mounted light source 10. Moreover, light sources generally concentrate the light along the optical axis, so that the maximum intensity is at or near the optical axis 36 (that is, along the nadir 36).

Figure 2:
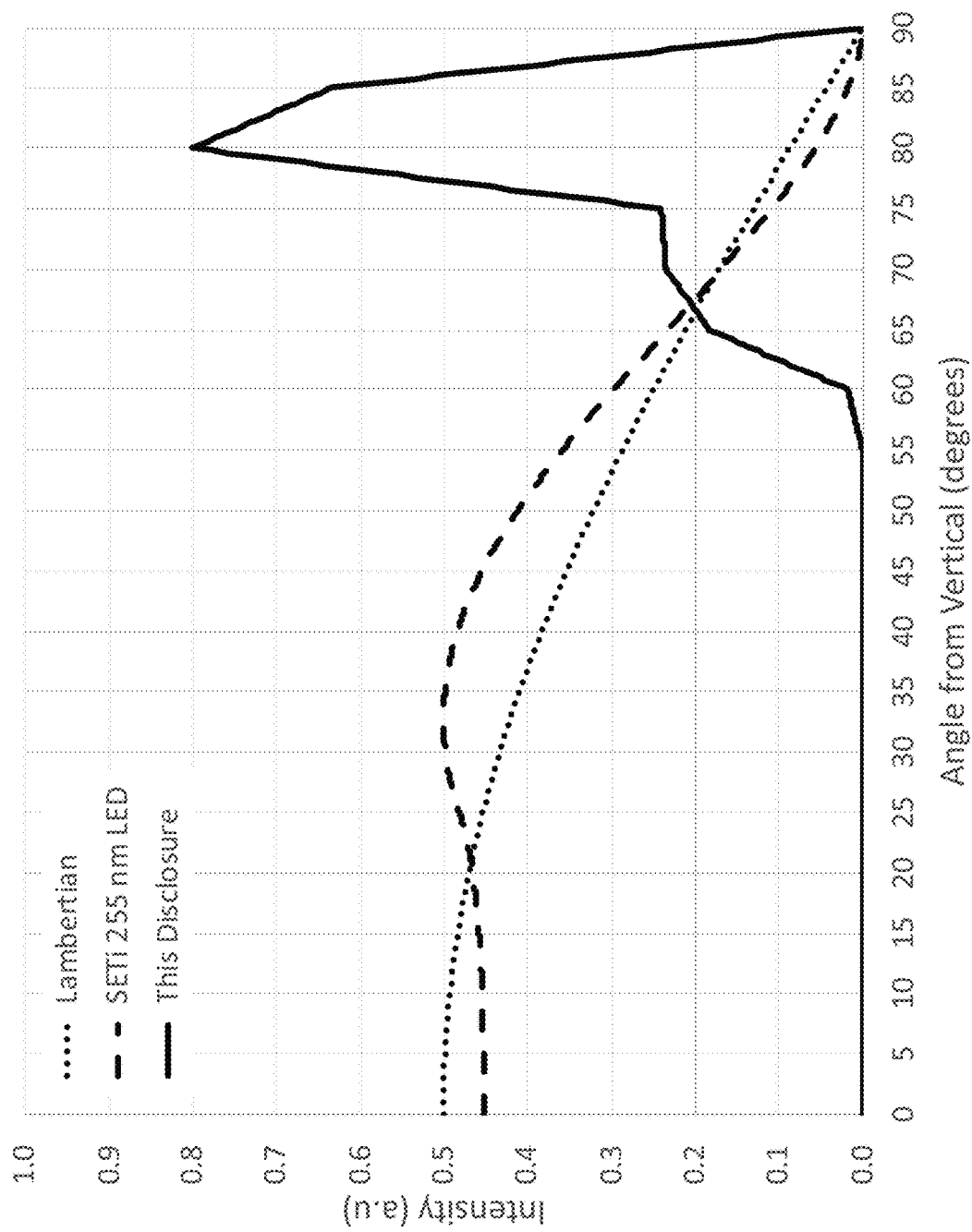
FIG. 2 plots intensity-versus-angle from vertical for a ceiling-mounted light source (e.g. nadir) for some illustrative light sources as described herein.

With reference to FIG. 2, for example, two typical light source intensity distributions are shown. One of these is an ideal Lambertian distribution, which is often used to model the light intensity distribution of small light sources such as an LED. The Lambertian distribution is peaked at the optical axis (0-degrees in FIG. 2, corresponding to the nadir when used as a downlight), and gradually drops off until reaching zero intensity at 90-degrees (corresponding to horizontal when used as a downlight). The other light distribution shown in FIG. 2 is for a 255 nm LED manufactured by SETi Sensor Electronic Technology Inc. (Columbia, South Carolina, USA). The SETi 255 nm LED has an intensity distribution concentrated along the optical axis, as it is largely flat and peaks slightly at about 33-degrees and then gradually drops off until reaching zero intensity at 90-degrees.

Also, since the irradiance decreases with increasing distance from the light source, the maximum irradiance anywhere in the occupied space below the EL plane 14 is expected to be measured at the EL plane 14 (i.e., closest to the light source while still in the occupied space. Hence, to set (or verify) the irradiance of the light source satisfies the applicable regulatory exposure limit, the detector 20 with (e.g.) 40° half-angle cone 22 is placed facing directly upward, directly underneath the light source, and at the EL plane 14, to measure the maximum irradiance output by the light source over the acceptance cone 22. (Note, FIG. 1 shows the detector 20 in the occupied space and oriented directly upward, but not placed at the EL plane 14.)

However, as disclosed herein, in a space with arbitrary dimensions the fluence rate incident on the aerosolized virus 30 may be enhanced significantly by tailoring the intensity distribution, without changing the irradiance measured using the detector 20 with acceptance cone 22 placed facing directly upward at the EL plane 14 and directly underneath the light source 10. This is done by tailoring the angular intensity distribution of the light source 10 to enhance the horizontal component of the irradiance versus the vertical component.

Figure 3:
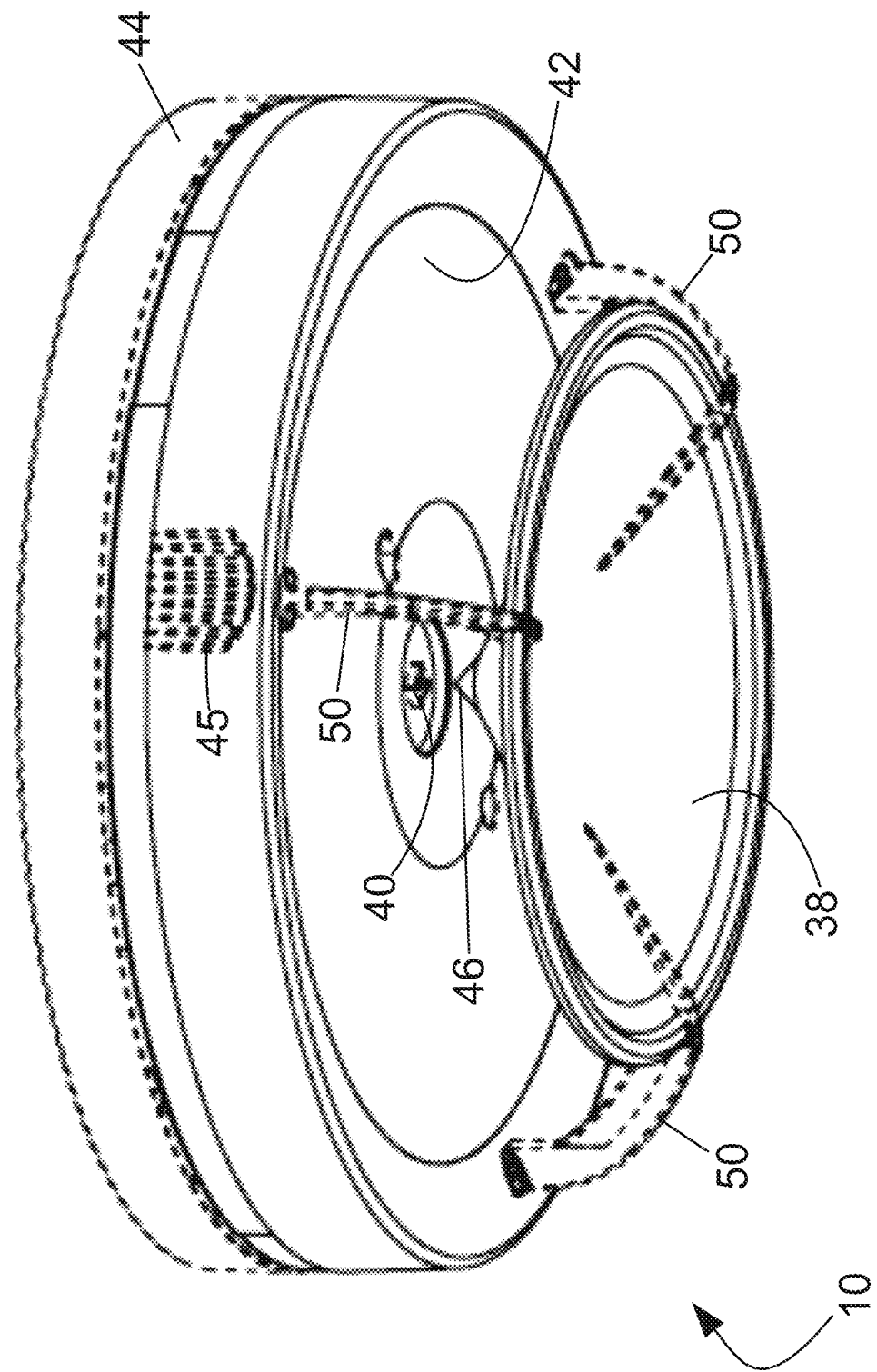
FIGS. 3 and 4 diagrammatically illustrate perspective and side views, respectively, of a light source employing a funnel-shaped reflector according to an embodiment.
Figure 4:
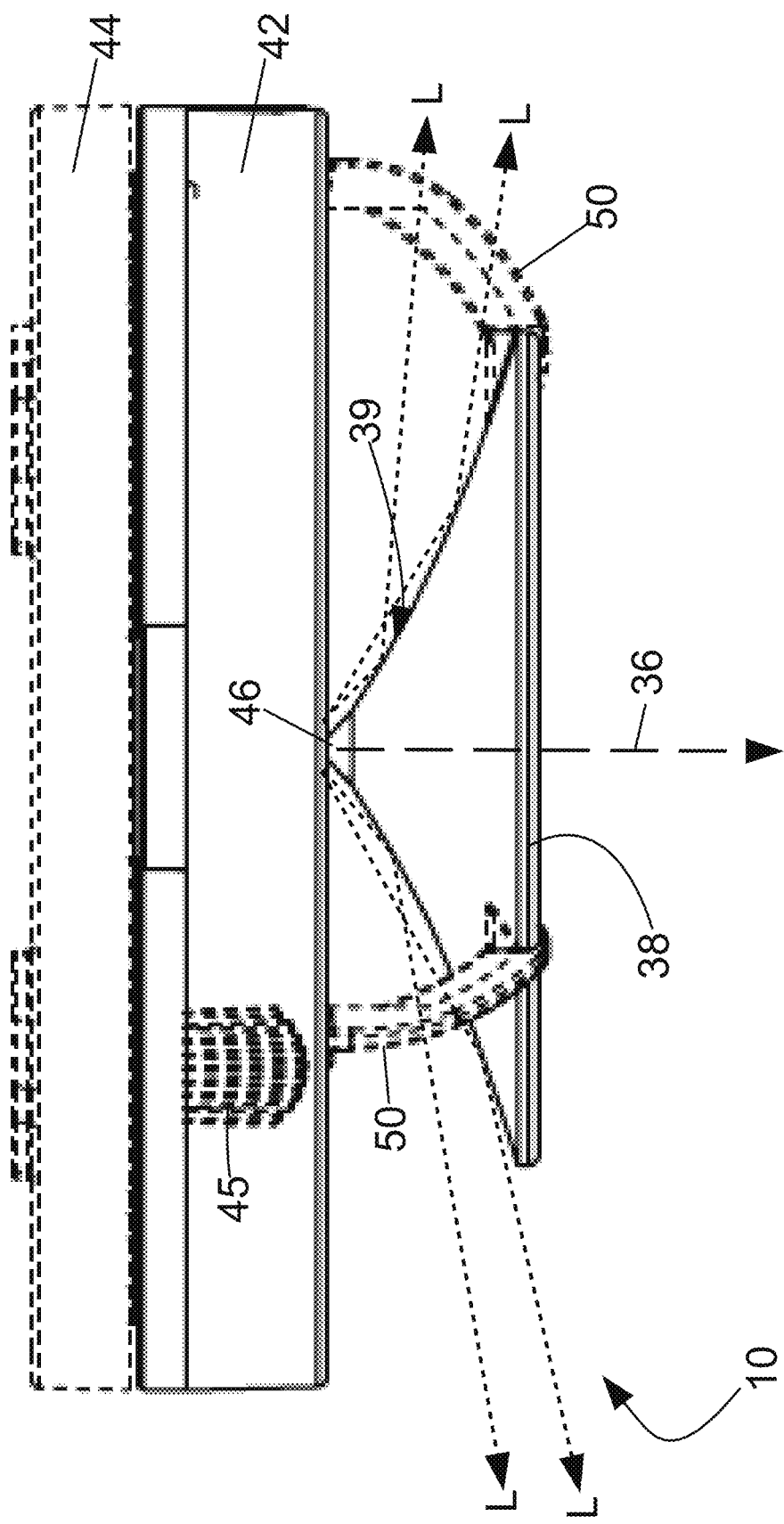
Figure 5:
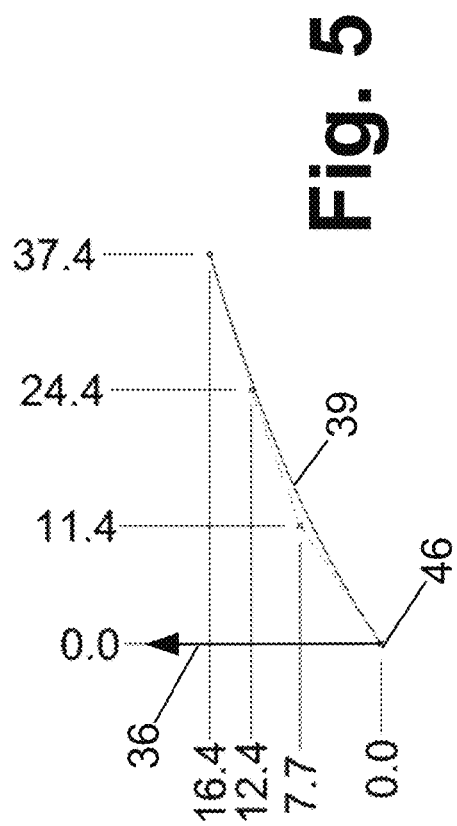
FIGS. 5 and 6 show a detailed curvature of the funnel-shaped reflector of FIGS. 3 and 4 according to one detailed design embodiment.
Figure 6:
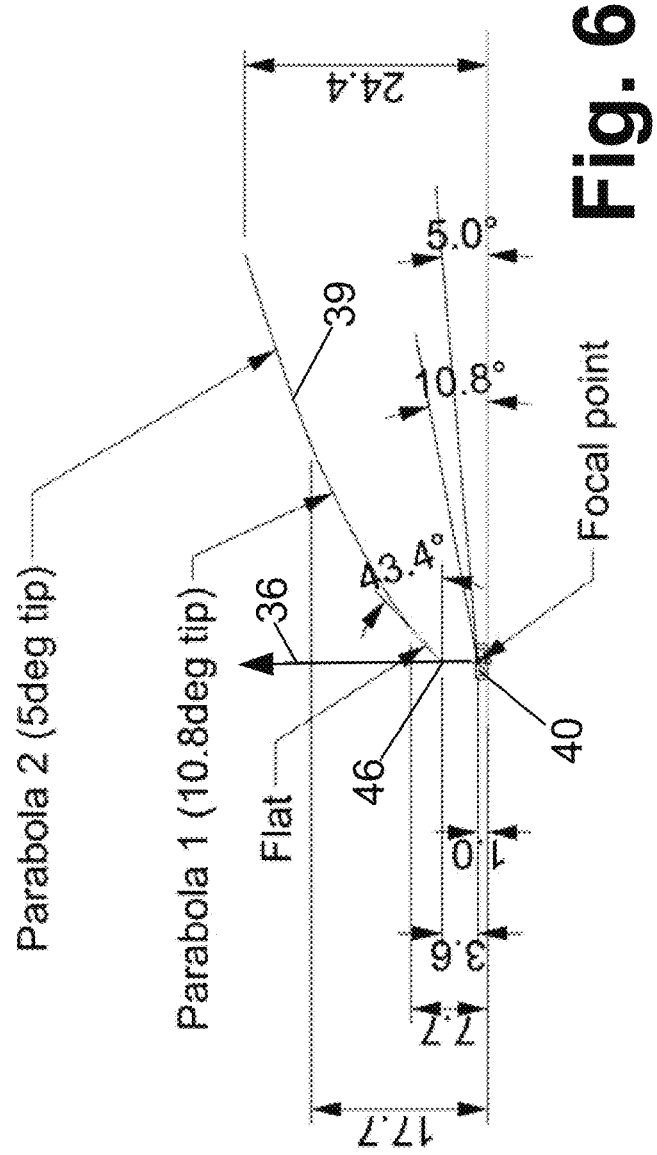

With further reference to FIGS. 3 and 4 showing detailed perspective and side views of the light source 10 of FIG. 1, and FIGS. 5 and 6 which show dimensioned side-sectional views of a reflective surface 39 of the reflector 38 of the light source 10, in the light source 10 the tailoring of the angular intensity distribution is done by the reflective surface 39 of the reflector 38. The illustrative reflector 38 has a reflective surface 39 having a funnel shape that can, for example, be conoidal. The reflective surface 39 of the reflector 38 diverts some or all the UV light from a centrally placed light emitting diode (LED) 40 toward the horizontal direction, as indicated in FIG. 4 by four representative light rays L. (Note that the reflective surface 39 of the reflector 38 faces the LED 40). The illustrative LED 40 may, for example, be a centrally placed UV-C LED 40 mounted on a surface of a support structure 42 that in turn screws onto (or clamps onto, or otherwise detachably attaches to) a ceiling-mounted base 44 (shown in dashed lines). Hence, the funnel-shaped reflective surface 39 is facing the support structure 42 on which the LED 40 is mounted. The single centrally placed LED may also be replaced by, or supplemented by, one or more off-axis LEDs, especially a plurality of LEDs located equidistant from the optical axis and equidistant from each other to form a cylindrically symmetric LED array. The off-axis LED or LEDs may also provide for an asymmetric beam pattern. One or more roughened areas 45 are optionally provided as finger-grips for assisting in installing the support structure 42 on the ceiling-mounted base 44. Moreover, other support structure attachment mechanisms are contemplated, e.g. the ceiling-mounted base 44 may be omitted and the support structure 42 may be directly secured to the ceiling by bolts, clamps, adhesion, or another fastening technique.

With particular reference to FIGS. 5 and 6, the reflective surface 39 of the illustrative reflector 38 has a conoidal shape, that is, the reflective surface 39 is shaped as a solid formed by revolution of a conic section about an axis or (in the example of FIGS. 5 and 6) a revolution of a fusion of conic sections about an axis (namely the optical axis 36, corresponding to the nadir 36 when the light source 10 is ceiling-mounted). The reflective surface 39 includes an apex 46 arranged on the optical axis 36 and located directly above the single LED 40 which is also arranged on the optical axis 36 as shown in FIG. 6, or located directly below the LED 40 when ceiling-mounted as in FIGS. 3 and 4. As labeled in FIG. 6, starting at the apex 46 and moving outward generally away from the apex 46, the fusion of conic sections includes an initial flat section (as labeled in FIG. 6; forming a straight-edged cone when revolved around the optical axis 36), followed by a first parabolic section (Parabola 1 labeled in FIG. 6; forming a first paraboloid section when revolved around the optical axis 36), followed by a second parabolic section (Parabola 2 labeled in FIG. 6; forming a second paraboloid section when revolved around the optical axis 36).

With particular reference back to FIGS. 3 and 4, one or more curved arms 50 (drawn with dashed lines) attach the reflector 38 to the support structure 42 so that the reflector 38 is positioned below the UV-C LED 40 when the light source 10 is ceiling-mounted. While three curved reflector-attachment arms 50 are illustrated, the number of arms 50 could be as few as one, or two, or three (as shown), or four, or five, or six or more. Generally, having more arms provides a more secure attachment of the reflector 38 to the support structure 42, but having more arms increases material and manufacturing cost and potentially increases light loss due to light being blocked by the arms 50. Three arms 50 beneficially provides the fewest number of arms that fully suppresses any tendency of the reflector 38 to twist or torque about the arms; hence, in some embodiments at least three arms 50 are provided to attach the funnel-shaped reflector 38 to the support structure 42. The arms 50 are typically, although not necessarily, spaced at equidistant angular intervals around the optical axis 36, e.g. the illustrative three arms 50 are spaced at 120° angular intervals around the optical axis 36. The illustrative arms 50 attach to the side of the reflector 38 opposite from the reflective surface 39, which advantageously avoids occupying any portion of the reflective surface 39 facing the LED 40 with arm attachments; however, other arrangements are contemplated such as providing one, two, three, four, five, six, or more straight posts connecting between the surface of the support structure 42 on which the LED 40 is disposed and the reflective surface of the reflector 38 facing the LED 40 (variant not shown).

Moreover, while one UV-C LED 40 is shown, the support structure 42 can include one (as shown), two, three, four, or more LEDs emitting UV-C, and/or UV-A, and/or ultraviolet light in another or other portion(s) of the UV spectrum. The LEDs may optionally also emit light outside of the UV spectrum, e.g. a combination of UV and violet light as an example.

In general, the funnel-shaped reflective surface 39 of the reflector 38 has its apex 46 on the optical axis 36 of the light source 10 and either contacting the support structure 42 or (as illustrated) with the apex 46 being the closest part of the funnel-shaped reflective surface 39 to the support structure 42. Said another way, the apex 46 is proximate to the support structure 42 and the funnel of the funnel-shaped reflective surface 39 expands with increasing distance away from the support structure 42 along the optical axis 36. Said yet another way, the funnel-shaped reflective surface 39 has its apex 46 positioned on the optical axis 36 of the light source 10 and oriented with the funnel of the funnel-shaped reflective surface 39 expanding with increasing distance from the support structure 42 along the optical axis 36. It should be noted that the apex 46 is not necessarily a singular point—for example, the apex could have a finite circular cross-section, or in other words the funnel of the funnel-shaped reflective surface 39 may have its terminal point cut-off, the same way that a frustrum of a cone has its terminal point cut-off. In embodiments with only a single LED 40 (as in the illustrative embodiment), the single LED is preferably located centered on the apex 46 of the reflective surface 39. In embodiments with two or more LEDs (not shown), the two or more LEDs can be arranged around the apex 46 of the reflective surface 39, typically close to the apex 46. In these latter embodiments, the apex 46 could directly attach to the support structure 42. If this central attachment at the apex 46 provides sufficiently secure attachment of the reflector 38, then the arms 50 are contemplated to be completely omitted in such embodiments.

The detailed shape of the funnel-shaped reflective surface 39 can be conoidal, as nonlimiting illustrative examples. The illustrative reflective surface 39 has a shape described by a revolution of a fusion of conic sections about the optical axis 36, in which the conic sections include a fusion of three conic sections: (i) a straight section forming a cone when rotated about the optical axis 36; (ii) a first parabolic section forming a first paraboloid section when rotated about the optical axis 36; and (iii) a second parabolic section forming a second paraboloid section when rotated about the optical axis 36. More generally, the fusion of conic sections may include a combination of one, two or more conic sections selected from the group including straight sections, parabolic sections, and higher-order sections. For example, the fusion of conic sections may include a combination of a straight section forming a cone when rotated about the optical axis 36 and one, two, three, or more parabolic sections forming corresponding paraboloid sections when rotated about the optical axis 36. As another example, the fusion of conic sections may include a combination of a parabolic section forming a paraboloid when rotated about the optical axis 36 and a third-order polynomial section forming a corresponding third-order conic surface when rotated about the optical axis 36.

Even more generally, the funnel-shaped reflective surface 39 may have the shape comprising a revolution of a fusion of one or more straight or curved sections about the optical axis 36. Still more generally, the detailed shape of the funnel-shaped reflective surface 39 can be tailored to provide a desired intensity distribution for the UV light output by a design-basis one or more LEDs positioned at or near the apex 46 (e.g., an illustrative one LED 40), for example by performing ray tracing simulations to estimate the intensity distribution for various shapes of the funnel-shaped reflective surface 39.

With further reference to FIGS. 7 and 8 and reference back to FIG. 2, a prototype light source with a reflective surface shaped as shown in FIGS. 5 and 6 has been actually constructed, and the light intensity spectrum for that light source was simulated by ray tracing (FIG. 7A) to produce a polar intensity-versus angle plot (FIG. 7B). The intensity distribution was also actually measured for the prototype light source, and the result is shown in FIG. 2 as the solid curve labeled "This Disclosure". As can be seen in FIGS. 2, 7A, and 7B, the effect of the reflector 38 is to push the intensity distribution away from the optical axis 36 (i.e., nadir when ceiling-mounted as shown in FIGS. 7 and 8, corresponding to 0° on the x-axis in FIG. 2) and out toward the horizontal (corresponding to 90° on the x-axis in FIG. 2), with most light intensity being in the 75°-85° range. The sharp intensity dropoff above 85° is due to a slight curvature of the surface of the support structure 42 on which the LED 40 is mounted (that slight curvature is best seen in FIGS. 3 and 7A).

Figure 8C:
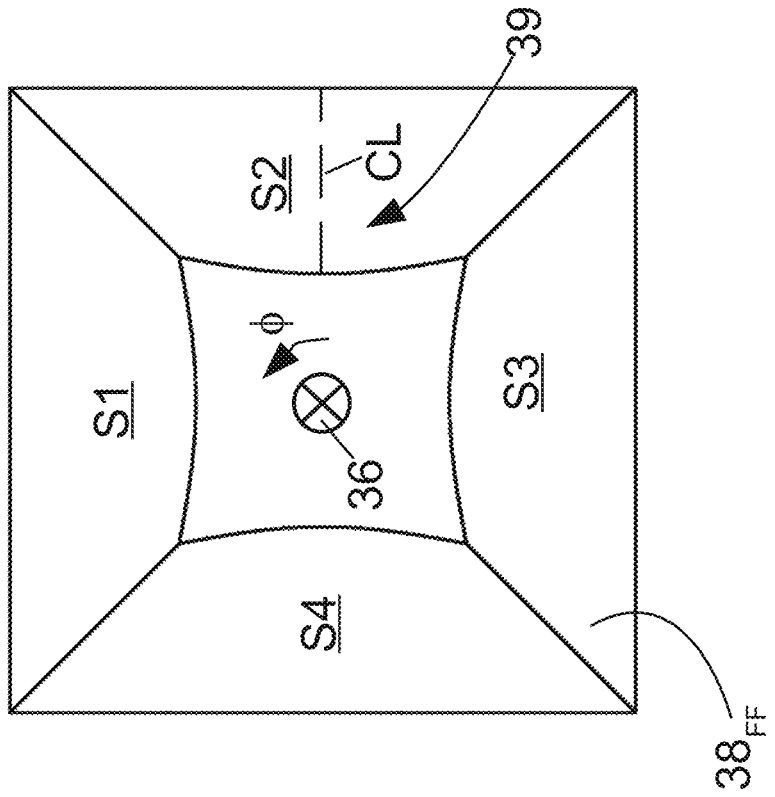
Figure 8B:
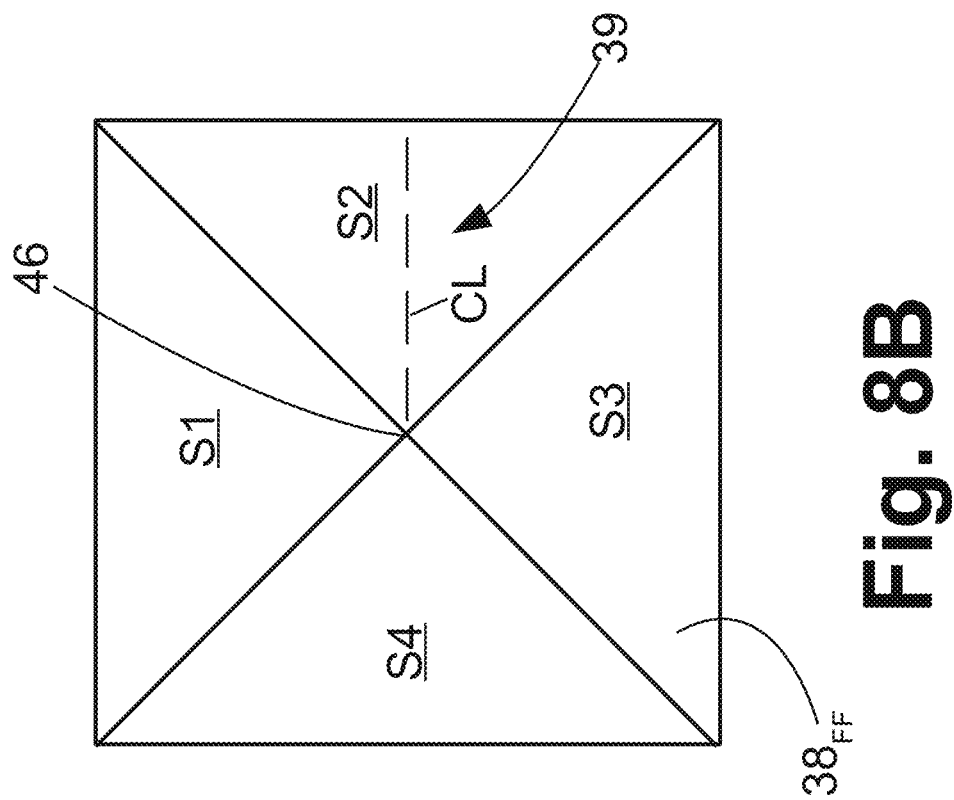

With reference to FIGS. 8A and 8B and 8C, in another embodiment a variant funnel-shaped reflector $38_{FF}$ which has four-fold rotational symmetry is shown. FIG. 8A shows the reflector $38_{FF}$ in conjunction with the support structure 42 and ceiling-mounted base 44 forming a light source $10_{FF}$. (The attachment arms 50 are omitted in FIG. 8A). The variant light source of FIG. 8A further shows multiple LEDs $40_1$, $40_2$ encircling the apex 46 of the four-fold symmetric funnel-shaped reflector $38_{FF}$. The four-fold symmetric funnel-shaped reflector $38_{FF}$ has four reflective surface facets, which are indicated as surface facets S1, S2, S3, and S4 in the isolation view of the reflector $38_{FF}$ looking down the apex shown in FIG. 8B. In some embodiments, each reflector facet has a curvature along a centerline CL of the facet that is a conic section or a fusion of conic sections, for example such as the curvature shown in FIGS. 5 and 6. Optionally, each facet may also have a curvature in the direction around the optical axis 36, as seen in Section S-S of FIG. 8C. The curvature in the direction may optionally correspond to that formed by revolving the conic section or fusion of conic sections along the centerline CL around the optical axis. While the illustrative four-fold symmetric funnel-shaped reflector $38_{FF}$ has four facets and four-fold symmetry, it will be appreciated that more generally an N-fold symmetric funnel-shaped reflector with N-facets can be employed, where N may for example be N=2, N=3, N=4 (as shown in FIGS. 8B and 8C), N=5, or higher. In some embodiments, N is a relatively large number, enabling an approximation of the fully rotationally symmetric funnel-shaped reflector 38 of FIGS. 3-6, 7A, and 7B that may be more easily manufactured, for example by a sheet metal bending, stamping, or other sheet metal forming process.

FIGS. 2-6, 7A, 7B, 8A, and 8B depict an embodiment of the light source employing a reflective optic, namely the funnel-shaped reflective surface 39 of the reflector 38.

Figure 9:
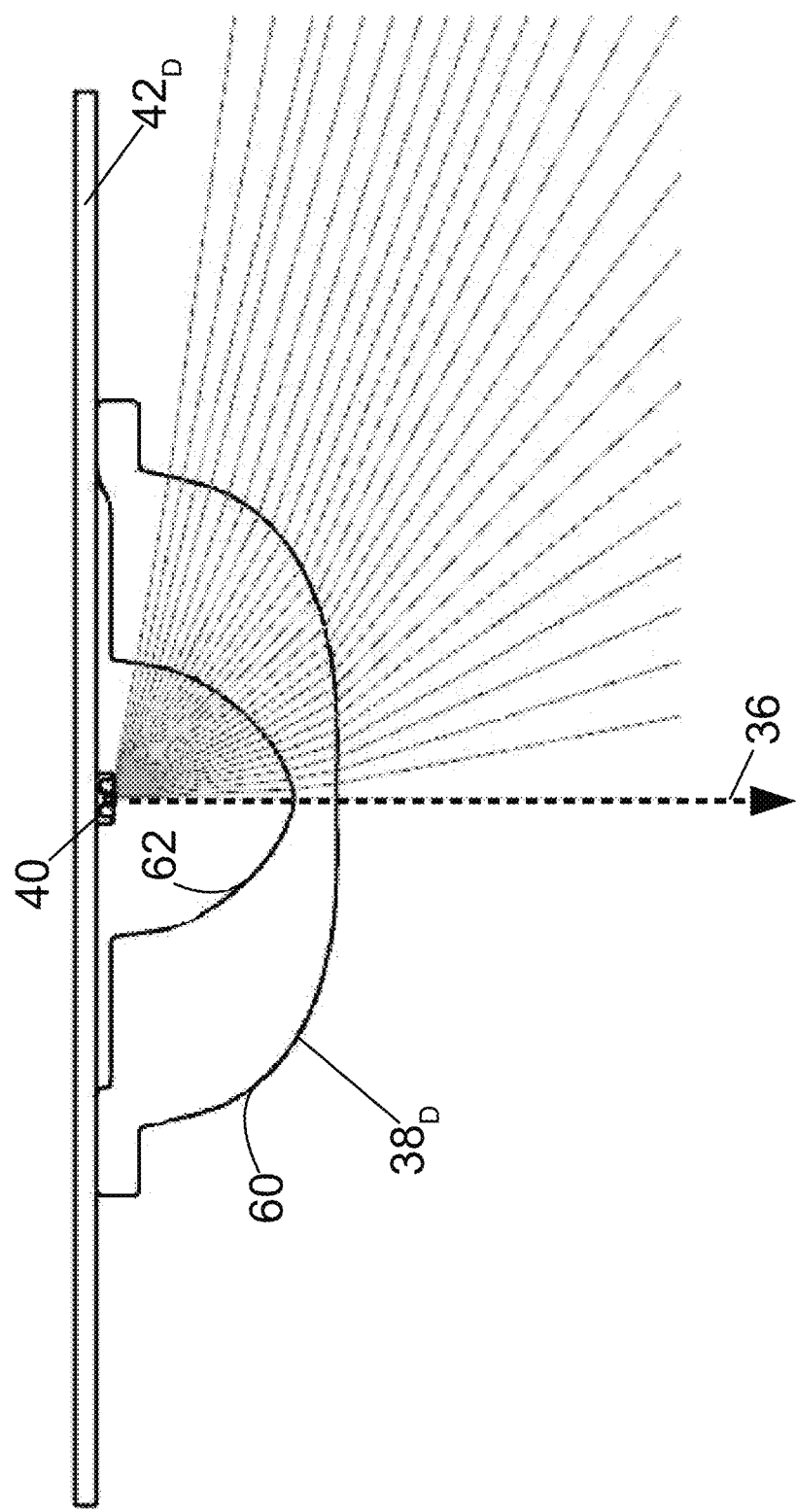
FIG. 9 diagrammatically illustrates a side view of a light source employing a refractive optic according to an embodiment.
Figure 10:
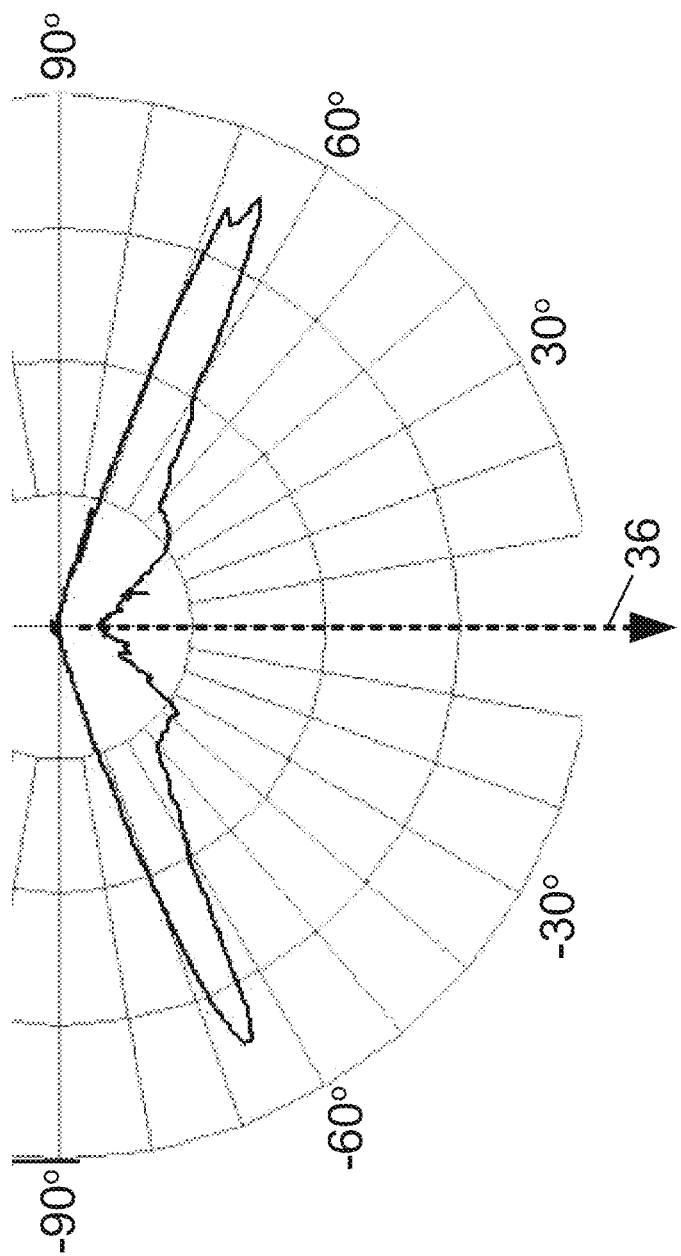
FIG. 10 diagrammatically shows a polar intensity-versus angle plot for the light source of FIG. 9.

With reference to FIGS. 9 and 10, in another embodiment the optic is a refractive optic $38_D$ mounted over the UV LED 40 (or, more generally, over the one or more UV light emitters) on the support structure $42_D$. FIG. 9 shows a ray tracing diagram similar to that shown for the reflective surface 39 in FIG. 7. With suitable optimization of the curvatures of the outer surface 60 and inner surface 62 of the refractive optic $38_D$, it is straightforward to obtain a light intensity distribution such as that shown by polar plot in FIG. 10 (which is similar to the polar plot of FIG. 8 for the reflector 38).

In the following, it is further demonstrated that UV light sources including the disclosed optics pushing the light intensity away from the nadir enables enhanced fluence rate for deactivating airborne and surface-borne pathogens, without increasing the irradiance measured by the detector 20 with acceptance cone 22 as previously described.

Having described some illustrative embodiments with reference to FIGS. 1-10, in the following some optical design approaches for designing such light sources to provide fluence rate enhancement at fixed EL of at least about 3-4× are described. It is also noted that other applications benefitting from enhanced fluence rate in a habitable, irradiated volume (DIBEL) include spaces with a relative low ceiling height, e.g., about 8-9 feet or less, and relatively large width and or height (>>8 feet). In such geometries, increasing the angle relative to vertical at which the LED radiation is aimed may greatly increase the volume-integrated fluence rate while not exceeding the EL at the top of the habitable zone (at the EL plane 14, see FIG. 1).

In any space occupied by people, it's likely that both viral and bacterial contamination may be present in the space. Although the very small and light virus particles and some smaller bacteria may remain airborne for many hours before settling onto a surface, the larger and heavier bacteria are either transferred from surface-to-surface, or if released into the air, settle onto a surface quickly. The primary vector for transmission of bacterial disease is via surfaces or liquids, although the tuberculosis bacterium is a good counter-example, being primarily transmitted by air. Bacteria can remain vital on surfaces for many days, or in the case of spores, indefinitely long. Further, unlike the potential for airborne transmission of virus between people in just a few minutes, the likely timeframe for transmission of large bacteria or spores via surface transfer may be many hours or days.

One embodiment of DIBEL in a typical indoor space comprising a rectilinear volume having a width W, length L, and height H may be a regular array of identical UV emitters in the ceiling, aimed vertically down toward the floor. The EL is typically presently evaluated at 2.1 m above the floor level (the "irradiance EL plane" 14 of FIG. 1, for example), per IEC 62471 and other regulations, and this value is used in the following examples. It is straightforward to adjust the approach for other EL values, such as 1.8 meter. The occupied zone of the space is thus considered to be the volume between the floor and the 2.1 m height above the floor. A typical mounting height for the UV light source may be about 2.4 m above the floor level (for a ceiling height H approximately 8 feet). The Upper Room of the space is considered to be the volume between the ceiling and the EL plane 14. In the present example, the Upper Room extends from 2.1 m to 2.4 meter above the floor level.

The radiated light from a single LED, typically emitting light from a light emitting surface (LES) on the order of 1 mm×1 mm, is considered to be in the far-field zone at distances >10× the maximum lateral extent of the LES, so about 10 mm for typical dimensions of a single LED. In the far field, the irradiance from each LED diminishes with the square of the distance away from the emitter, the usual $1/r^2$ dependence (where r is the distance). If every LED in the regular array is aimed vertically downward, then the location of maximum irradiance in the occupied zone will be found at the top of the occupied zone, at 2.1 m above the floor. This will be true regardless of the angular distribution of emission from the LEDs, if reflections from walls and other surfaces in the occupied zone are neglected (which may be reasonable as typical reflectance of indoor building materials in the UV-C are ~10-40%). If the intensity distribution from the identical UV emitters is Lambertian, or any other distribution having a maximum intensity at 0 degrees (measured from vertical the location of maximum irradiance, i.e. corresponding to the nadir for a downwardly-oriented ceiling-mounted LED), then the location of maximum irradiance in the EL plane 14 will be directly below one or more of the UV emitters. In this illustrative example, the irradiance in the EL plane will typically be significantly non-uniform, unless the spacing (i.e., "pitch") between the UV emitters is reduced to a distance comparable to the Upper Room depth, in this example, about 0.3 m, or about 1 foot. Such a low-pitch array of UV emitters may be undesirable for aesthetic and/or cost reasons.

For coronaviruses, and many other viruses and infectious pathogens, a major transmission vector is by way of respiratory droplets or aerosols produced when an infected person coughs, sneezes, talks, shouts, or sings. In one model of this transmission vector, the droplets evaporate quickly, leaving desiccated droplet nuclei (mostly dehydrated particles containing the virus) suspended in ambient air for on the order of about an hour to a day before settling onto surfaces. In a room, vehicle cabin, an aircraft cabin, train compartment, or other (at least mostly) enclosed environment for human occupancy, this means that airborne virus particles present a transmission threat for about an hour or much longer after an infected person leaves the environment. For this reason, a disinfection lighting system intended to quickly inactivate airborne pathogens in a volume subject to a limited irradiation exposure on an EL plane 14 (see FIG. 1) adjacent to the volume should provide an enhanced three-dimensional (3-D) fluence rate throughout the volume, well above the limiting two-dimensional (2-D) irradiance at the EL plane. The ratio, F (Figure of Merit), of the volume-averaged Fluence rate (in W/m²) in the volume to the maximum Irradiance (in W/m²) in the EL plane is a measure of the benefit of the optical system in the disinfection lighting system.

$$F = \frac{\text{volume} - \text{averaged Fluence rate}}{\text{maximum Irradiance in the } EL \text{ plane}} \quad (1)$$

With reference back to FIG. 1, the detector 20 with acceptance cone 22 accepts incident rays within an 80-degree cone (40-degree half-cone) onto the radiometer (irradiance detector 20), while rays outside of the 80-degree cone are excluded from the radiometer, such that only a portion of the intensity distribution at the EL plane is included in the measurement of the EL. Again, the 80-degree acceptance cone mimics the acceptance cone of the human eye, whose acceptance cone is similarly limited to around an 80-degree cone by the eye socket.

The Exposure Limit (EL) is characterized as a planar irradiance, representing the flux received by a solid surface, like the skin or eye, and is measured with a cosine-corrected, 80°-limited radiometer. The radiometer is to be located (x-y-z) and aimed (θ, ϕ) to find the maximum Irradiance in the occupied space.

On the other hand, a spherical (or other 3-dimensional) object (such as a virus or bacterium) suspended in the volume below the EL plane may be irradiated from any direction within the full 4π-steradian angular coordinate system. In general, the source of the radiation may be located anywhere within or outside of the irradiated volume, including above, below, and from each side of the volume.

The acceptance angle of the eye-mimicking radiometer 20 is thereby much smaller than the acceptance angle of a 3-D target object suspended in the space (e.g., a droplet nuclei containing virus). Based on this, it is recognized herein that it is possible to irradiate an object suspended in the volume with a (3-D) fluence rate (in W/m²) that exceeds the measured (2-D) irradiance (also measured in W/m²) at the EL plane by a significant factor.

Figure 11:
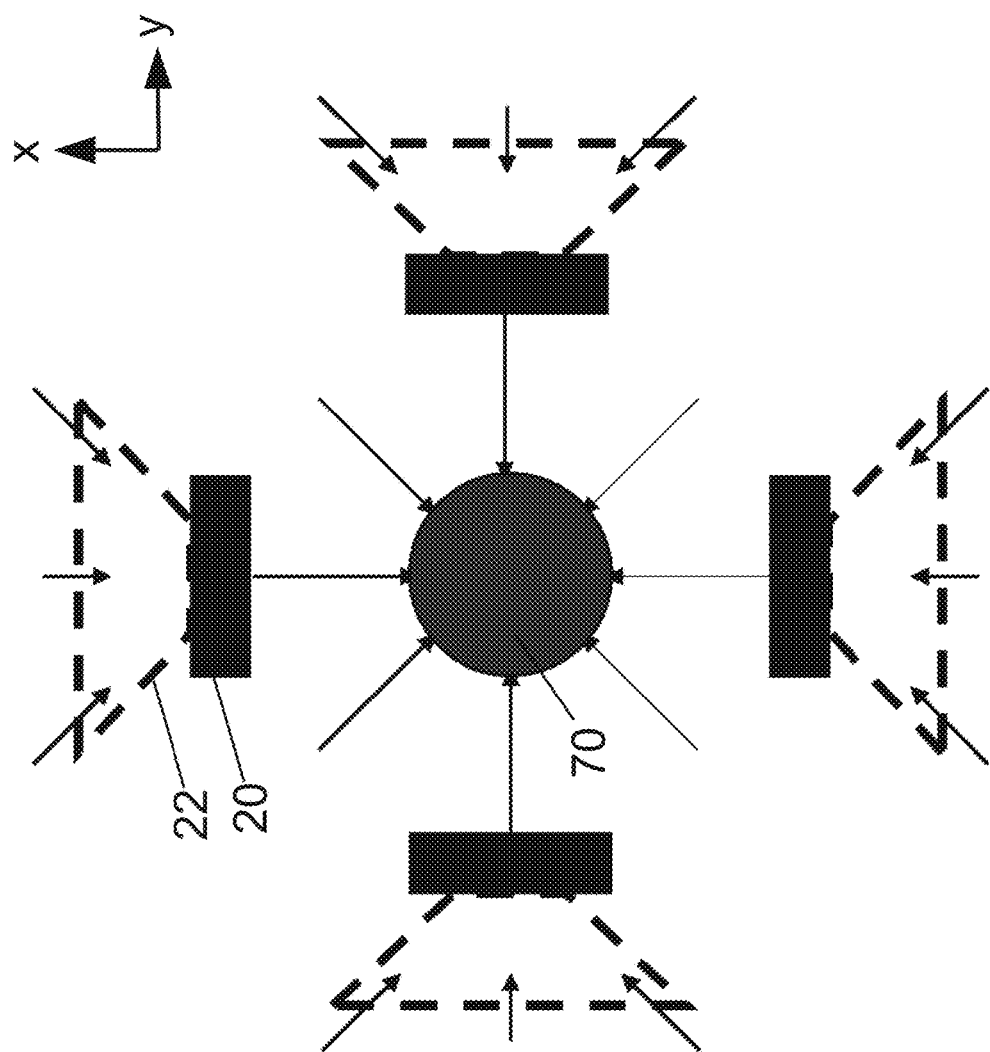
FIGS. 11 and 12 diagrammatically show an overhead view (FIG. 11) and a side view (FIG. 12), respectively, of a spherical object in an occupied space and some radiometer positions for measuring fluence on the spherical object.

With reference to FIG. 11, a first approximation of this geometric relation is shown for a spherical object (such as a virus or bacterium) 70 from a top view (showing the +/−x and y axes, but not the +/−z axis). FIG. 11 indicates that the fluence enhancement factor is about F=6, based on summing the irradiances measured with a 2-D radiometer from each of the 6 orthogonal directions in the x-y-z rectilinear coordinate space.

Figure 12:
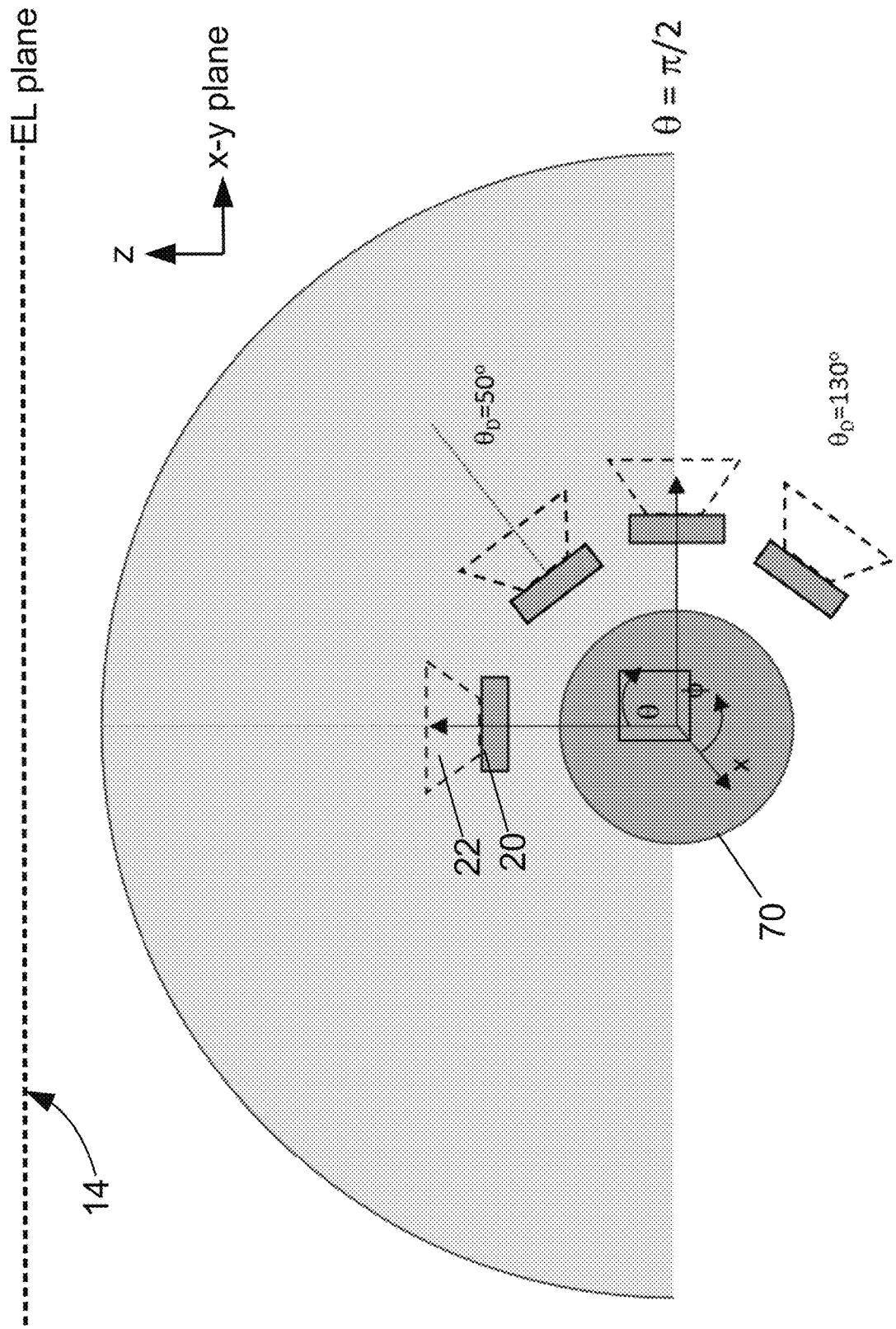

With reference to FIG. 12, however, in ceiling-mounted lighting the radiation sources are all located above the EL plane 14 (also shown in FIG. 1) irradiating the volume below the EL plane 14, so that there is no vertically upward irradiance in the absence of reflected radiation from below the EL plane. The −z axis may carry fluence, but the +z axis may not (no rays allowed incident from below horizontal). Eliminating the possibility of fluence incident onto the target object from below the horizontal, reduces the 6 orthogonal directions to 5, thereby reducing the expected fluence enhancement factor to about F=5.

Lighting embodiments disclosed herein optically redirect the intensity distribution from the UV emitters to provide more intensity at high angles (e.g., in a range from about 55 degrees, or higher, to about 90 degrees) and less intensity at low angles (e.g., in a range from about 0 degrees to about 55 degrees, or lower; see FIGS. 7B and 10) in order to provide a more uniform irradiance distribution at the EL plane 14 (see FIG. 1), which allows for a greater flux of UV to enter the occupied zone below the EL plane while limiting the irradiance in the EL plane to a value below the exposure limit.

The enhancement of volume fluence rate relative to maximum irradiance in the EL plane pertains to applications that are subject to the EL's for Actinic or UV-A radiation, i.e., any UV wavelength in the range 200-400 nm. The light emitted by the at least one light source 10 includes an inactivating portion having peak wavelength in a range of 200 nanometers to 400 nanometers inclusive. More generally, the light emitted by the at least one light source 10 may be UV light (defined as the wavelength range 100 nanometers to 400 nanometers inclusive), or may be some range within the UV-C spectrum, such as 200-280 nanometers inclusive or within the UV-A spectrum, such as 320-400 nanometers inclusive. Depending on the type of light source 10, the light may be narrow-band light, e.g., predominantly a single discrete emission line or a set of discrete emission lines, or may be broad-band light. Preferably the intensity of the light emitted by the at least one light source 10 is effective to achieve at least 90% inactivation of the virus pathogen in the ambient air within about two hours. On the other hand, the efficacy of UV-C light for inactivating virus pathogen on a surface is much lower (e.g., requiring about 10 times more UV-C light in some reports); hence, the irradiance at the one or more surfaces may in some embodiments be not effective to achieve at least 90% inactivation of the virus pathogen on the one or more surfaces within about two to four hours, but may be inactivated by the longer-term dose within 8 hours or over multiple 8-hour doses. These are merely illustrative example, and the values for $D_{90}$ and $t_{90}$ depend on the type of pathogen, the wavelength or spectrum of light, and the designed light intensity.

While the illustrative light source 10 of FIG. 3 includes one UV-C LED 40, the support structure 42 (or more generally, a specific embodiment of the light source 10) can include one, two, three, four, or more LEDs emitting UV-C, and/or UV-A, and/or ultraviolet light in another or other portion(s) of the UV spectrum. In some embodiments each light source 10 comprises one or more LEDs 40, for example disposed on a printed circuit board or other substrate and optionally mounted on or in a housing. The LEDs are UV LEDs that emit light in the UV range (100-400 nanometers inclusive) or some sub-range within the UV range such as UV-C (100-280 nanometers inclusive), UV-B (280-315 nanometers inclusive), or UV-A (315-400 nanometers inclusive), or some specific range 200-280 nanometers, 200-275 nanometers, 200-270 nanometers, 240-280 nanometers, 240-275 nanometers, 240-270 nanometers, or so forth. The LEDs may be aluminum gallium nitride (AlGaN) LEDs, although other types of UV- or UV-C-emitting LEDs may be used. In some embodiments, there may be as few as a single LED 40 (as in FIG. 3). The substrate or other support for the LED(s) may optionally be coated with a UV- or UV-C-reflective layer such as an aluminum layer, a silver layer, an expanded foam Teflon (e.g. e-PTFE from W.L. Gore) layer, or so forth to increase the light emission efficiency.

It is also contemplated for the light source(s) 10 to employ a non-solid-state lamp such as mercury (Hg), xenon (Xe), Excimer, or so forth. By way of nonlimiting illustrative example, the light source(s) may include a medium pressure Hg lamp, or a low pressure Hg lamp.

Having provided an overview of some disclosed viral disinfection systems and methods, in the following some further aspects and more detailed embodiments are described.

The following terms are used herein.

"Actinic dose" [$J/m^2$] is the quantity obtained by weighting spectrally the dose according to the actinic action spectrum value at the corresponding wavelength.

"Exposure limit" (EL) [$J/m^2$] is the level of exposure to the eye or skin that is not expected to result in adverse biological effects. Individuals in the vicinity of lamps and lamp systems shall not be exposed to levels exceeding the exposure limits.

"Fluence", F [$J/m^2$] is the radiant energy incident on a small sphere from all directions divided by the cross-sectional area of that sphere.

"Fluence Rate", F [$W/m^2$] is identical to "Spherical Irradiance", $E_{sph}$, the radiant energy incident on a small sphere from all directions divided by the cross-sectional area of that sphere; and reduces to irradiance, E [$W/m^2$], for a parallel and perpendicularly incident beam.

"Intensity", I [W/sr], is the radiant flux (i.e., power) emitted, reflected, transmitted or received, per unit solid angle.

"Irradiance", E [$W/m^2$], at a point of a surface is the quotient of the radiant power incident on an element of a surface containing the point, by the area dA of that element.

"Spectral Irradiance, $E_\lambda$, is the derivative of Irradiance, E, with respect to wavelength, $\lambda$. SI unit is $W/m^3$; common unit is $W/m^2$-nm.

"Ultraviolet (UV) radiation" pertains to the range between 10 nm and 400 nm, commonly subdivided into UV-A, from 315 nm to 400 nm; UV-B, from 280 nm to 315 nm; and UV-C, from 100 nm to 280 nm.

The Actinic UV hazard exposure limit for exposure to ultraviolet radiation incident upon the unprotected skin or eye apply to exposure within any 8-hour period. Continuous exposure for times greater than 8 hours in any day need not be considered. The Near-UV hazard applies to exposure to UV-A radiation incident upon the unprotected eye. The Actinic hazards is measured in terms of Irradiance×time in $J/m^2$, and the Near-UV hazard is measured in irradiance× time [$J/m^2$] for times shorter than 1,000 seconds, and in Irradiance [$W/m^2$] for t>1,000 s. Both hazards are prescribed in IEC 62471 to be measured at the location and orientation of maximum Irradiance in the EL plane, or any location below in the occupied volume. To protect against injury of the eye or skin from ultraviolet radiation exposure produced by a broadband UV source, the effective wavelength-integrated and time-integrated spectral irradiance (effective radiant exposure, or effective dose), E, of the light source shall not exceed 30 $J/m^2$.

In some illustrative embodiments, the light source 10 comprises one or more light emitting diodes (LEDs) 40 (e.g., FIG. 3) having peak wavelength in the UV-C, preferably in the range 200-280 nm, more preferably about 250-280 nm, most preferably about 255-275 nm, providing an effective actinic dose of not more than 30 $J/m^2$ at the floor of the space (assuming ceiling mounting of the light sources 10).

In FIG. 1, there is a single ceiling-mounted light source 10 depicted. However, to cover an entire room or other environment 2 for human occupation, a plurality (e.g. two-dimensional array) of ceiling-mounted light sources 10 may be used. The superposition of irradiances from a plurality of LEDs or luminaires is given in Equation (2) below by summing the contributions from each light source 10 with the result for the ideal spacing for a square array to achieve uniform irradiance having minimum irradiance greater than 50% of maximum irradiance in a the target plane (for example, the EL plane 14), where D is the spacing between the point light sources (LED or luminaire) and Z is the distance from the plane of the array of light sources (the ceiling in this disclosure) to the illumination plane (the EL plane 14 of FIGS. 1 and 12 in this disclosure).

$$D = \sqrt{\frac{4}{3}} Z = 1.15 \quad (2)$$

While a square array of light sources is used in the above estimate, a more efficient array of LEDs or luminaires may result from a close-packed hexagonal array, rather than a square array. However, typical grid layouts in ceilings tend to be square or rectangular, not hexagonal. Therefore, in order to ensure that no portion of a target plane receives less than 50% of the irradiance received at the location of maximum irradiance (which will determine the exposure limit according to IEC 92741), the spacing between LEDs or luminaires should be no greater than about 1.15 times the distance from the LEDs or luminaires to the target irradiation plane. Referring again to FIG. 1, if the LEDs or luminaires 10 are mounted on or in the ceiling 4 at a height that is eight feet above the floor 6, and the floor 6 is the target plane, then the LEDs or luminaires should be spaced no further apart than about 9 feet in a square array. If, instead, the target plane is the EL plane which is only about 1 foot below the ceiling 4, then the LEDs or luminaires should be spaced no further apart than about 1.15 feet in a square array. Although there is some preference for providing a greater number of LEDs or luminaires having a smaller spacing, there is usually a stronger preference based on aesthetics and cost for having the fewest possible number of LEDs or luminaires in the ceiling. Therefore, a solution in which the spacing between the LEDs or luminaires is larger, e.g. several feet for more, can be beneficial.

Because a typical distance from the LEDs or luminaires to the target irradiation plane (e.g., EL plane 14) is only about 1 foot (~30 centimeters), the spacing between UV light sources should be less than or about 1 foot (~30 centimeters) to provide acceptably uniform irradiance across the EL plane. Beneficially, the present disclosure provides solutions to improving uniformity, without increasing areal density, by modifying the angular distribution of radiation from the LEDs or luminaires using optics.

FIGS. 3-6, 7A, 7B, 8A, and 8B illustrate suitable designs of a reflective optic to modify the angular distribution from the UV light source avoid exceeding the maximum 2-D irradiance allowed at the EL plane as well as to enhance the 3-D fluence rate throughout the volume. FIGS. 9-10 illustrate one suitable design of a refractive optic to modify the angular distribution from the UV light source avoid exceeding the maximum 2-D irradiance allowed at the EL plane as well as to enhance the 3-D fluence rate throughout the volume. IEC 662471 and some other similar regulations regarding Actinic hazard EL require tilting the radiometer 20 (see FIG. 1) through all angles to find the orientation at which the 2-D irradiance, limited by the 80° cone, is maximum. The shaded hemisphere of FIG. 12 indicates the range of directions from which UV light from ceiling-mounted light source(s) 10 may radiate onto the suspended particle (pathogen) when limited to light sources above the EL plane which is adjacent to the irradiated volume. No radiation may be incident from any angles below 90° ($\pi/2$).

With reference back to FIG. 12, if the angular intensity distribution of UV light is an isotropic hemisphere, as shown in FIG. 12, i.e., constant as a function of angle from $\theta=0°$ through 90° in vertical angle, and constant from $\phi=0°$ through 360° in the orthogonal angular direction, then with the radiometer 20 oriented at $\theta=0°$ (looking vertically upward) will read the maximum irradiance. The same is true for all orientations of the radiometer from $\theta=0°$ through 50°, since the half-angle of the cone limiting the acceptance of light into the radiometer is 40°. Thus, the two radiometer positions shown at $\theta=0°$ and 50° orientation relative to vertical in FIG. 12, and any radiometer position at any orientation angle between 0° and 50°, will read the maximum possible irradiance in an isotropic intensity distribution. The radiometer position oriented at $\theta=90°$ ($\theta=\pi/2$) would read one-half of the maximum irradiance, and any radiometer oriented between $\theta=90°$ and $\theta=130°$ would read a non-zero irradiance below one-half of the maximum. Any radiometer oriented at $\theta>130°$ will read 0 irradiance. These varying irradiances vs. angle represent the fluence rate that is incident on the 3-D (shown as spherical) particle 70 suspended in the volume.

The isotropic intensity distribution is more favorable for providing high fluence to the suspended object 70 than an intensity distribution emitted by an LED having no optic, which is typically approximately Lambertian (see FIG. 2), that is maximum at normal incidence to the surface of the LED and decreasing with increasing angle away from the normal from a maximum at $\theta=0°$ (normal) to zero at $\theta=90°$ (tangential). However, the relatively favorable isotropic distribution would typically require a uniform distribution of light sources in all directions relative to the object, which is not provided by a disinfection system including only ceiling-mounted light source(s) 10. (Using UV light sources that are floor-mounted and/or wall-mounted is difficult because occupants on foot could approach arbitrarily close to such light sources, making it difficult or impossible to define an equivalent to the EL plane 14 of FIGS. 1 and 12 for safety design).

By way of nonlimiting illustration, deactivation of the SARS-CoV-2 virus is described briefly below. The SARS-CoV-2 has a spherical structure with a diameter of about 0.1 micron. The virus is primarily transferred between humans through the air, as opposed to via surfaces, water, or other means. The virus is introduced into the air as respiratory droplets by coughing, sneezing, singing or talking by the infected person, and the airborne virus particles are then inhaled by other people generally in the same interior space as the infected person. The virus may also be transmitted via air handling systems in the building, or less likely via exchange of air in the outdoors. While the transmission vectors of SARS-CoV-2 is an area of ongoing research, the present consensus is that the primary vector is air exchange from an infected person to other people sharing the same interior space.

The SARS-CoV-2 virus may typically be expelled from the infected person as a small droplet containing the virus. The liquid typically evaporates quickly, leaving the bare virus particles suspended in the air as an aerosol. While the liquid droplet generally protects the virus from UV radiation, the virus is about 10 times more vulnerable as a bare particle than when protected inside the droplet. The virus typically remains suspended in air for 1 to 3 hours or more, eventually settling onto a surface, where the virus is again protected, by contact with the surface, from UV radiation by about a factor of 10, as in water. Therefore, the virus should be preferentially irradiated by the disclosed viral disinfectant system while suspended in air as a bare particle.

A person breathing the contaminated air may need to be exposed for about 20 minutes to inhale enough virus to become infected. Of course, with higher concentrations of virus in air, as introduced by a cough or a sneeze, the (statistically) required time may be shorter. It is therefore advantageous to deliver as much UV-C energy (which is typically more effective against viruses than UV-A) as feasible in a few minutes' time whenever more than one person occupies the same interior space, especially if talking, singing, coughing, or sneezing is occurring. The disclosed ceiling-mounted light source(s) facilitate this while complying with irradiance-based safety regulations, by achieving a higher fluence rate in the occupied space for a given irradiance at the EL plane 14 compared with ceiling-mounted UV disinfection light sources that output intensity distributions with most of the intensity directed along or close to the nadir.

Ceiling-mounted UV disinfection light sources such as bare LEDs with approximately Lambertian light distributions (e.g. see FIG. 2) or LEDs with optics designed to form the light into a generally forward-directed light intensity distribution output most of the intensity directed along or close to the nadir. This would seem intuitive, since the occupied space is directly beneath the ceiling-mounted light source(s), so that such an intensity distribution would seem to be optimal.

Contrary to this expectation, however, the disclosed ceiling-mounted light source(s) form the light into an intensity distribution in which most of the irradiance is contained at angles of 55° (or higher) to 90° relative to the downward nadir of the ceiling-mounted light sources, with less or none of the irradiance contained at angles closer to the nadir (i.e. angles of 0° to 55°, or lower, relative to the downward nadir, or equivalently in a solid cone of 55° or lower centered on the nadir).

As explained above, the rationale for this distribution is that it achieves a higher fluence rate in the occupied space for a given irradiance at the EL plane 14 compared with ceiling-mounted light source(s) that direct most of their light intensity distribution generally forward (that is, at angles less than a threshold angle $\theta_{Tr}$ which may be 55° or larger in various embodiments, relative to the downward nadir, or equivalently in a solid-angle cone of azimuthal angle $\theta_{Tr}$ centered on the nadir).

The illustrative light sources of FIGS. 3-10 achieve this with zero, or close to zero, intensity at the nadir (that is, zero intensity at 0° in FIGS. 7B and 10). More generally, however, it is expected that a substantial increase in fluence rate for a given irradiance at the EL plane 14 can be achieved by having the angle-integrated intensity in the intensity distribution in the angular range of $\theta_{Tr}$ to 90° be higher than the angle-integrated intensity in the intensity distribution in the angular range of 0° to $\theta_{Tr}$. Hence, it is expected that the desired fluence rate increase can be achieved even with a substantial amount of light intensity at or near the nadir, so long as the light intensity distribution $I(\theta,\phi)$ of the light source(s) meets the condition:

$$\underbrace{\int_0^{2\pi} d\phi \int_{\theta_{Tr}}^{90} I(\theta, \phi)\sin\theta d\theta}_{\text{Angle-integrated intensity above } \theta_{Tr}} > W_H \cdot \underbrace{\left( \int_0^{2\pi} d\phi \int_0^{\theta_{Tr}} I(\theta, \phi)\sin\theta d\theta \right)}_{\text{Angle-integrated intensity below } \theta_{Tr}} \quad (3)$$

where the angle θ is measured respective to the optical axis of the light source 10 (corresponding to the nadir when the light source 10 is ceiling-mounted) and θ=0° corresponds to the optical axis (i.e. to the nadir when the light source 10 is ceiling-mounted), angle φ is the orthogonal angle in spherical coordinates (corresponding to an angle having axis of rotation on the optical axis), and $I(\theta,\phi)$ is the light intensity distribution at spherical coordinate RC. The weight $W_H$ and the threshold angle $\theta_{Tr}$ are parameters defining how strongly the light is concentrated at larger angles respective to the nadir. More particularly, $\theta_{Tr}$ determines the angle respective to the nadir 36 of the ceiling-mounted light source (or, equivalently, respective to optical axis 36 prior to mounting) above which the light is concentrated; and $W_H$ indicates the extent of bias of the angle-integrated intensity toward those higher angles, e.g. if $W_H$=3 then the angle-integrated intensity above the threshold $\theta_{Tr}$ (corresponding to the left-side double-integral of Expression (3)) is at least three times larger than the angle-integrated intensity below the threshold $\theta_{Tr}$ (corresponding to the right-side double-integral of Expression (3)). The intensity distribution, $I(\theta,\phi)$ may be approximately axisymmetric, as is typically the case for a bare LED or an LED with an axisymmetric optic, or it may be axially asymmetric.

In one nonlimiting illustrative embodiment, $W_H$=1 and $\theta_{Tr}$ is 55°. Numerical calculations neglecting wall effects indicate that a ceiling-mounted light source satisfying Expression (3) with these values of $W_H$ and $\theta_{Tr}$ and outputting a given irradiance at the exposure limit (EL) plane 14 will provide a fluence rate below the EL plane that is at least 1.5 to 2 times larger than the fluence rate that would be achieved by a light source of the same intensity but having a Lambertian light intensity distribution. In the case of a UV-susceptible pathogen, such as SARS-CoV-2, Influenza A, rhinovirus, RSV, tuberculosis, pneumonia, pertussis, mumps, measles, and others, this enables at least a 1.5 to 2 times faster inactivation of the pathogen in air or on a surface, while subject to the regulated exposure limits, compared to a Lambertian intensity distribution.

In another nonlimiting illustrative embodiment, $W_H$=3 and $\theta_{Tr}$ is 55°. Numerical calculations neglecting wall effects indicate that a ceiling-mounted light source satisfying Expression (3) with these values of $W_H$ and $\theta_{Tr}$ and outputting a given irradiance at the exposure limit (EL) plane 14 will provide a fluence rate below the EL plane that is at least 1.5 to 4 times larger than the fluence rate that would be achieved by a light source of the same intensity but having a Lambertian light intensity distribution.

In the case of a UV-susceptible pathogen, such as SARS-CoV-2, Influenza A, rhinovirus, RSV, tuberculosis, pneumonia, pertussis, mumps, measles, and others, this enables at least a 1.5 to 2 times faster inactivation of the pathogen in air or on a surface, while subject to the regulated exposure limits, compared to a Lambertian intensity distribution.

In another nonlimiting illustrative embodiment, $W_H$=1 and $\theta_{Tr}$ is 65°. Numerical calculations neglecting wall effects indicate that a ceiling-mounted light source satisfying Expression (3) with these values of $W_H$ and $\theta_{Tr}$ and outputting a given irradiance at the exposure limit (EL) plane 14 will provide a fluence rate below the EL plane that is at least 1.5 to 3 times larger than the fluence rate that would be achieved by a light source of the same intensity but having a Lambertian light intensity distribution. In the case of a UV-susceptible pathogen, such as SARS-CoV-2, Influenza A, rhinovirus, RSV, tuberculosis, pneumonia, pertussis, mumps, measles, and others, this enables at least a 1.5 to 3 times faster inactivation of the pathogen in air or on a surface, while subject the regulated exposure limits.

The present disclosure has been described with reference to exemplary embodiments. Modifications and alterations may occur to others upon reading and understanding the preceding detailed description. It is intended that the present disclosure be construed as including all such modifications and alterations insofar as they come within the scope of the appended claims or the equivalents thereof.

The invention claimed is:

1. An ultraviolet (UV) irradiation system comprising:
   a light source having an optical axis, the light source including:
   a support structure configured to be mounted on a ceiling with the optical axis of the light source oriented vertically downward;
   one or more UV light emitting diodes (LEDs) disposed on a surface of the support structure and configured to emit UV light when electrically energized; and a reflector secured to the support structure and arranged to form the UV light emitted by the one or more UV LEDs into a light distribution having more angle-integrated intensity in the angular range $\theta_{Tr}$ to 90° relative to the optical axis than in the angular range 0° to $\theta_{Tr}$ relative to the optical axis, where $\theta_{Tr}$ is at least 55°;

wherein the reflector comprises a funnel-shaped reflective surface facing the support structure and having an apex positioned on the optical axis of the light source, the funnel-shaped reflective surface expanding with increasing distance from the support structure along the optical axis.

2. The UV irradiation system of claim 1 wherein $\theta_{Tr}$ is at least 65°.

3. The UV irradiation system of claim 1 wherein the light distribution has at least 3 times more angle-integrated intensity in the angular range $\theta_{Tr}$ to 90° relative to the optical axis than in the angular range 0° to $\theta_{Tr}$ relative to the optical axis.

4. The UV irradiation system of claim 1 wherein the funnel-shaped reflective surface comprises a conoidal reflective surface.

5. The UV irradiation system of claim 4 wherein the conoidal reflective surface is described by a revolution of a fusion of two or more different conic sections about the optical axis.

6. The UV irradiation system of claim 1 wherein the funnel-shaped reflective surface has N facets and has N-fold rotational symmetry about the optical axis.

7. The UV irradiation system of claim 1 wherein the funnel-shaped reflective surface has a curvature comprising a curved section or a fusion of two or more straight or curved sections.

8. The UV irradiation system of claim 1 wherein the light source further comprises one or more arms attaching the reflector comprising the funnel-shaped reflective surface to the support structure.

9. The UV irradiation system of claim 8 wherein the one or more arms includes a least three curved arms connecting with the reflector on a surface other than the funnel-shaped reflective surface.

10. The UV irradiation system of claim 1 comprising a plurality of said light sources mounted on the ceiling.

11. The UV irradiation system of claim 1 wherein:
the light source emits a light distribution $I(\theta,\phi)$ satisfying the inequality:

$$\int_0^{2\pi} d\phi \int_{\theta_{Tr}}^{90} I(\theta,\phi) \sin \theta d\theta > W_H \cdot (\int_0^{2\pi} d\phi \int_0^{\theta_{Tr}} I(\theta,\phi) \sin \theta d\theta)$$

where angle $\theta$ is measured respective to the optical axis and $\theta=0°$ corresponds to the optical axis, angle $\phi$ is the orthogonal angle in spherical coordinates, and $W_H$ is a weight parameter; and
wherein $W_H$ is greater than or equal to 1 and $\theta_{Tr}$ is greater than or equal to 55°.

12. The UV irradiation system of claim 11 wherein $\theta_{Tr}$ is at least 65°.

13. The UV irradiation system of claim 11 wherein $W_H$ is greater than or equal to 3.

14. The UV irradiation system of claim 1, further comprising:
at least three arms;
wherein the funnel-shaped reflective surface is connected with the support structure and the at least three arms.

15. An ultraviolet (UV) irradiation system comprising:
a light source having an optical axis, the light source including:
a support structure configured to be mounted on a ceiling with the optical axis of the light source oriented vertically downward;
one or more UV light emitters disposed on a surface of the support structure and configured to emit light when electrically energized; and
a reflector having a funnel-shaped reflective surface facing the support structure and having an apex positioned on the optical axis of the light source, the reflector oriented with the funnel-shaped reflective surface expanding with increasing distance from the support structure along the optical axis, wherein the funnel-shaped reflective surface has a shape described by a revolution of a fusion of two or more different straight or curved sections about the optical axis.

16. The UV irradiation system of claim 15 wherein the fusion of two or more different straight or curved sections about the optical axis includes a fusion of (i) a straight section whose revolution about the optical axis forms a cone, and (ii) a parabolic section whose revolution about the optical axis forms a paraboloid.

17. The UV irradiation system of claim 15 wherein the fusion of two or more different straight or curved sections includes a fusion of (i) a first parabolic section whose revolution about the optical axis forms a first paraboloid, and (ii) a second parabolic section whose revolution about the optical axis forms a second paraboloid.

18. The UV irradiation system of claim 15 further comprising: at least three arms attaching the reflector to the support structure.

19. The UV irradiation system of claim 18 wherein the arms are curved and attach to a side of the reflector opposite from the funnel-shaped reflective surface.

20. The UV irradiation system of claim 15 wherein the funnel-shaped reflective surface is arranged to form the UV light emitted by the one or more UV light emitters into a light distribution having more angle-integrated intensity in the angular range $\theta_{Tr}$ to 90° relative to the optical axis than in the angular range 0° to $\theta_{Tr}$ relative to the optical axis, where $\theta_{Tr}$ is at least 55°.

21. An ultraviolet (UV) irradiation system comprising:
a light source having an optical axis, the light source including:
a support structure configured to be mounted on a ceiling with the optical axis of the light source oriented vertically downward;
two or more UV light emitters disposed on a surface of the support structure and configured to emit UV light when electrically energized; and
a reflector secured to the support structure and arranged to form the UV light emitted by the one or more UV light emitters into a light distribution having more angle-integrated intensity in the angular range $\theta_{Tr}$ to 90° relative to the optical axis than in the angular range 0° to $\theta_{Tr}$ relative to the optical axis, where $\theta_{Tr}$ is at least 55°;
wherein the reflector comprises a funnel-shaped reflective surface facing the support structure and having an apex positioned on the optical axis of the light source and attached to the support structure with the two or more UV light emitters arranged around the apex, the funnel-shaped reflective surface expanding with increasing distance from the support structure along the optical axis.

* * * * *